US012286558B2

(12) United States Patent
Liu et al.

(10) Patent No.: US 12,286,558 B2
(45) Date of Patent: Apr. 29, 2025

(54) UV-CURABLE ANTI-SMUDGE AND ANTI-GRAFFITI COMPOSITIONS

(71) Applicant: Queen's University at Kingston, Kingston (CA)

(72) Inventors: Guojun Liu, Kingston (CA); Heng Hu, Kingston (CA); Chao Zheng, Chongqing (CN); Kaka Zhang, Shenzhen (CN)

(73) Assignee: Queen's University at Kingston, Kingston (CA)

( * ) Notice: Subject to any disclaimer, the term of this patent is extended or adjusted under 35 U.S.C. 154(b) by 734 days.

(21) Appl. No.: 16/623,577

(22) PCT Filed: Jul. 6, 2018

(86) PCT No.: PCT/CA2018/050829
§ 371 (c)(1),
(2) Date: Dec. 17, 2019

(87) PCT Pub. No.: WO2019/006559
PCT Pub. Date: Jan. 10, 2019

(65) Prior Publication Data
US 2021/0147711 A1 May 20, 2021

Related U.S. Application Data

(60) Provisional application No. 62/529,275, filed on Jul. 6, 2017.

(51) Int. Cl.
*C08L 83/04* (2006.01)
*C08G 77/442* (2006.01)
(Continued)

(52) U.S. Cl.
CPC ......... *C09D 183/10* (2013.01); *C08G 77/442* (2013.01); *C08G 2150/00* (2013.01); *C08L 83/04* (2013.01); *C09D 143/04* (2013.01)

(58) Field of Classification Search
CPC ...... C09D 183/10; C09D 142/04; C08L 83/04
See application file for complete search history.

(56) References Cited

U.S. PATENT DOCUMENTS 5,010,141 A * 4/1991 Mueller ................. G02B 1/043
526/279
6,794,469 B2 * 9/2004 Obayashi .......... C08F 216/1408
524/436

(Continued)

FOREIGN PATENT DOCUMENTS

CA     2878683     1/2014
CA     2964415     4/2016

OTHER PUBLICATIONS

International Search Report and Written Opinion for corresponding International Patent Application No. PCT/CA2018/050829.

(Continued)

*Primary Examiner* — Margaret G Moore
(74) *Attorney, Agent, or Firm* — Angela Lyon

(57) ABSTRACT

A UV-curable durable coating composition is described that forms a transparent, antismudge coating. The composition includes a photoinitiator, a di-, tri-, or multi-functional monomer that bears double bonds, epoxide groups, or a combination, and a graft copolymer that bears pendant double bonds, epoxide groups or a combination and bears PDMS, polyisobutyl or perfluorinated polyether side chains.

8 Claims, 17 Drawing Sheets

(51) Int. Cl.
*C09D 183/10* (2006.01)
*C09D 143/04* (2006.01)

(56) References Cited

U.S. PATENT DOCUMENTS

| | | | |
|---|---|---|---|
| 8,247,078 B2* | 8/2012 | Sakano | C07F 7/21 |
| | | | 526/248 |
| 2012/0088861 A1* | 4/2012 | Huang | C08J 3/075 |
| | | | 526/279 |

OTHER PUBLICATIONS

Li, B. et al., "Synthesis of POSS-containing fluorosilicone block copolymers via RAFT polymerization for application as nonwelling coating materierals". Progress in Organic Coatings, vol. 78, pp. 188-199, (2015).

* cited by examiner

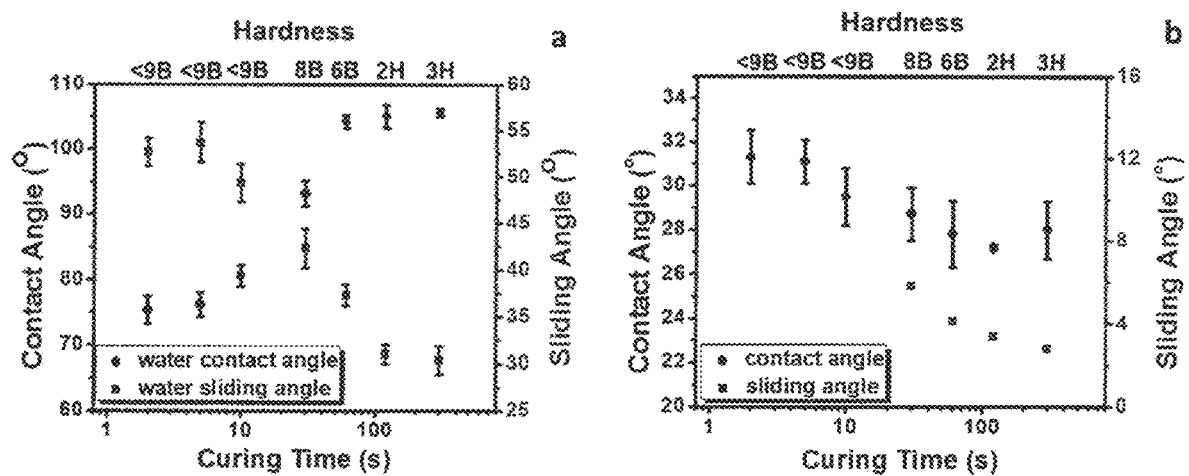
Fig. 3A-B
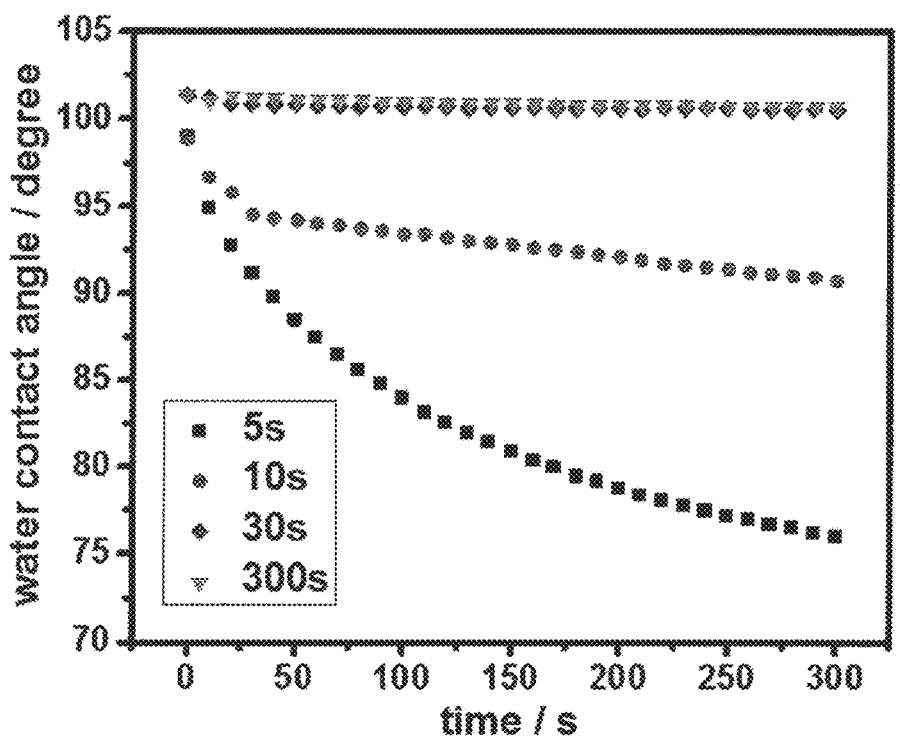
Fig. 4

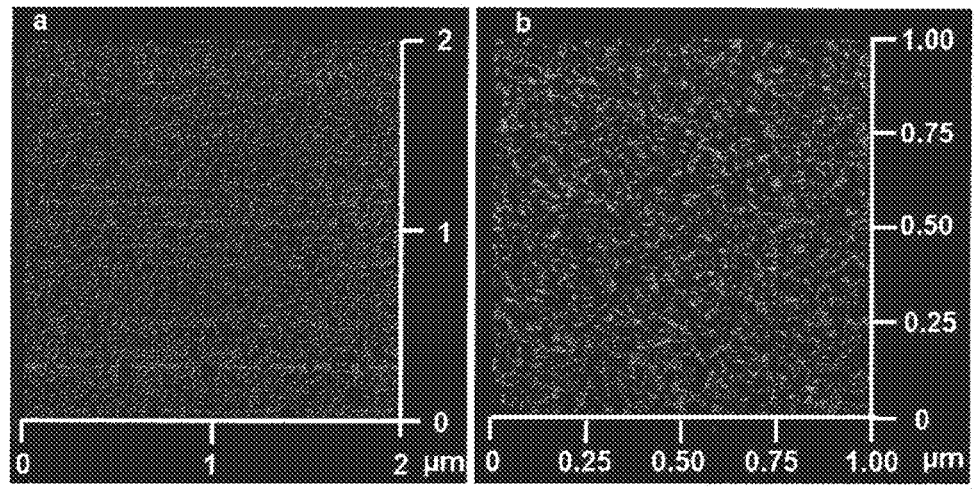
Fig. 7A-B
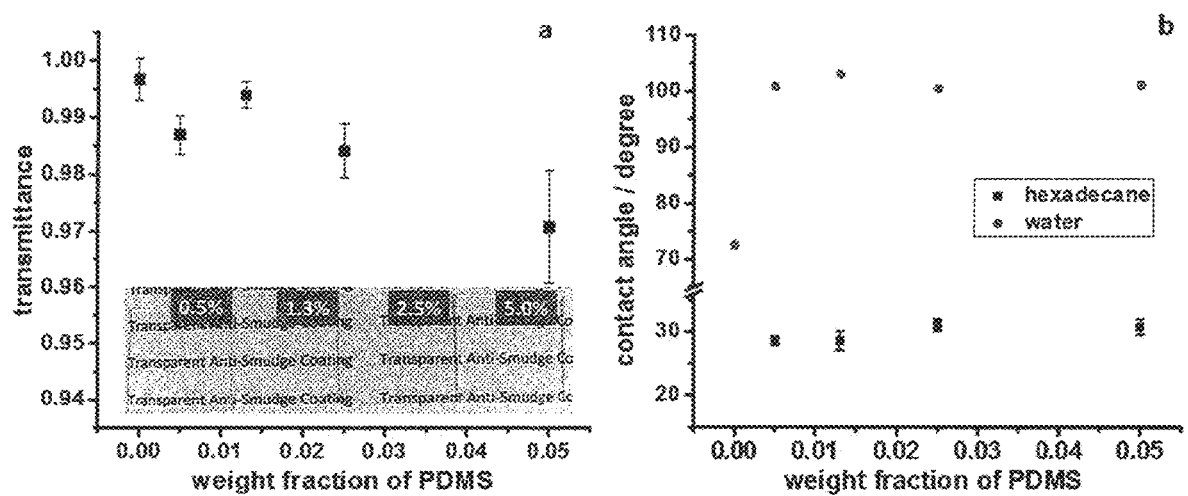
Fig. 8A-B

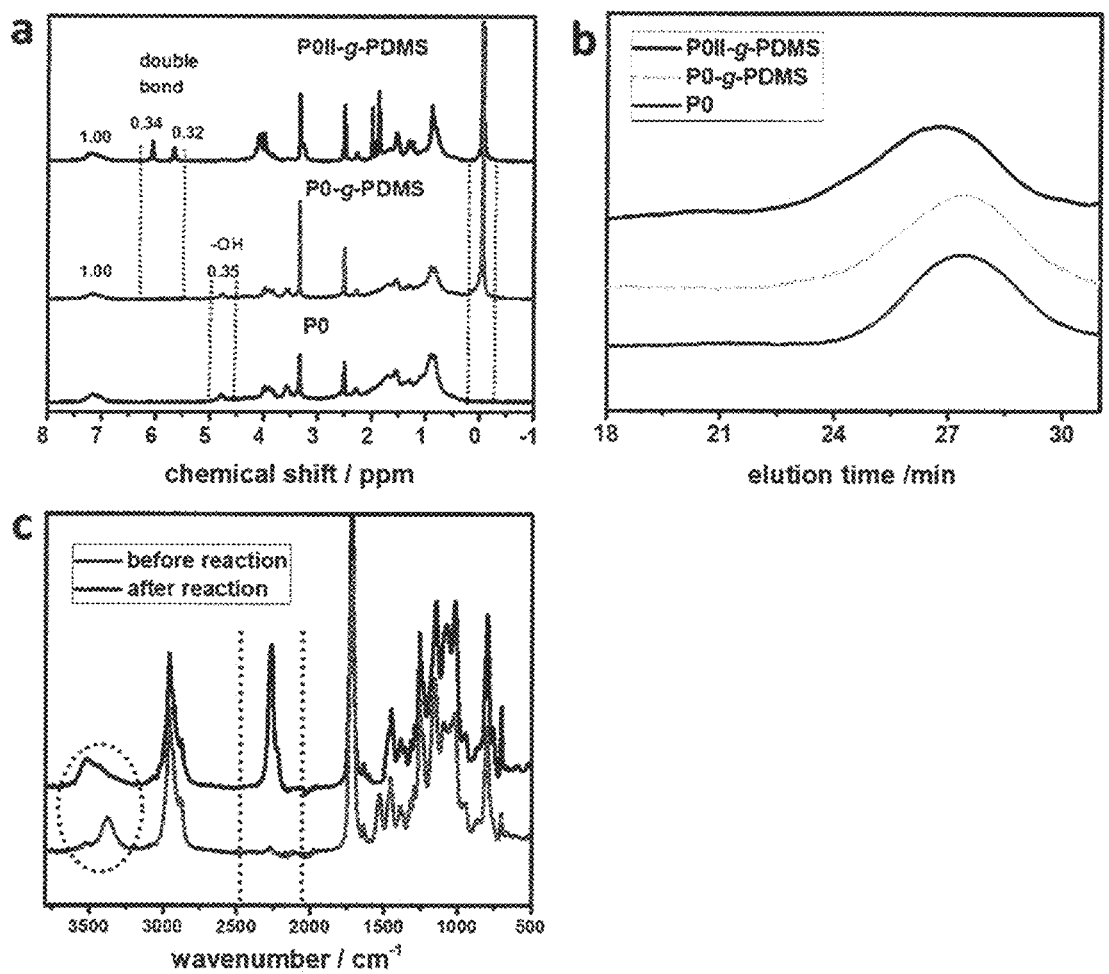
Fig. 10A-C
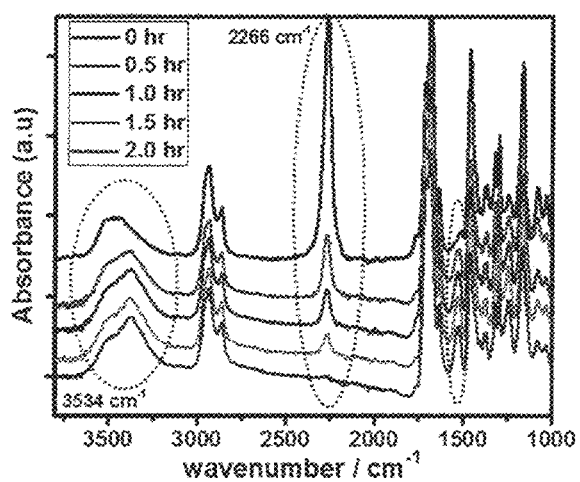
Fig. 11

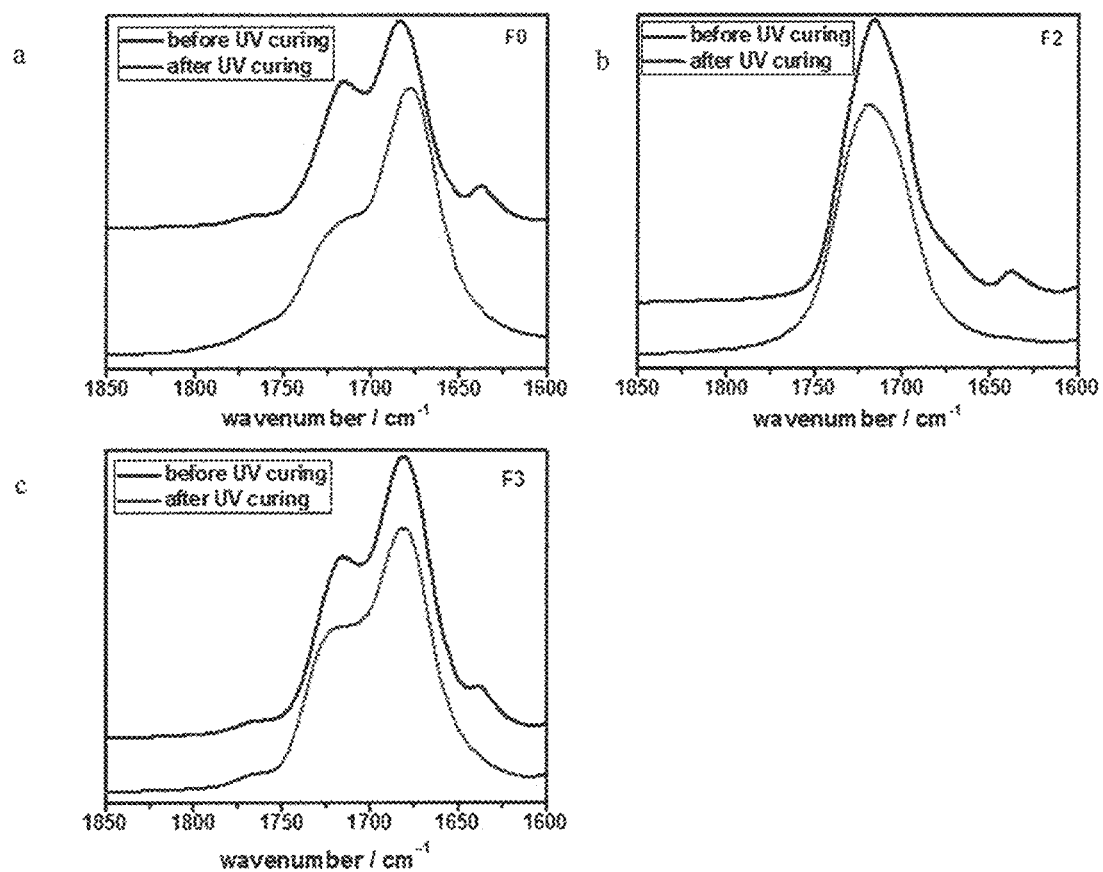
Fig. 12A-C
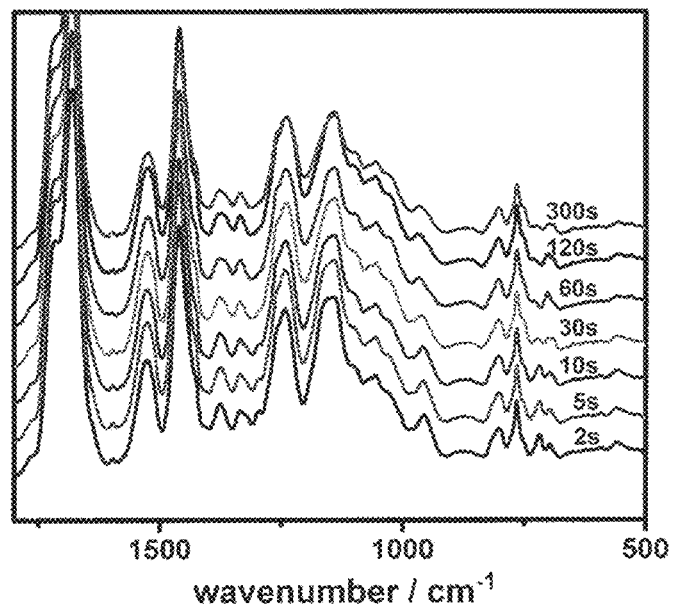
Fig. 13

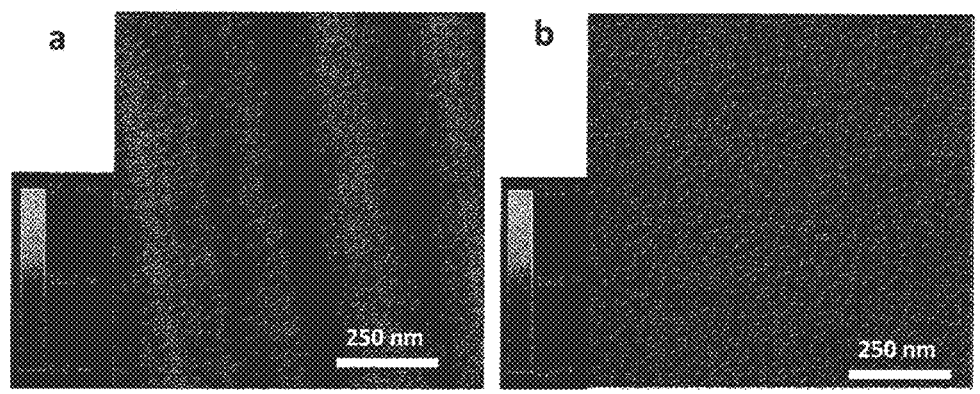
Fig. 14A-B
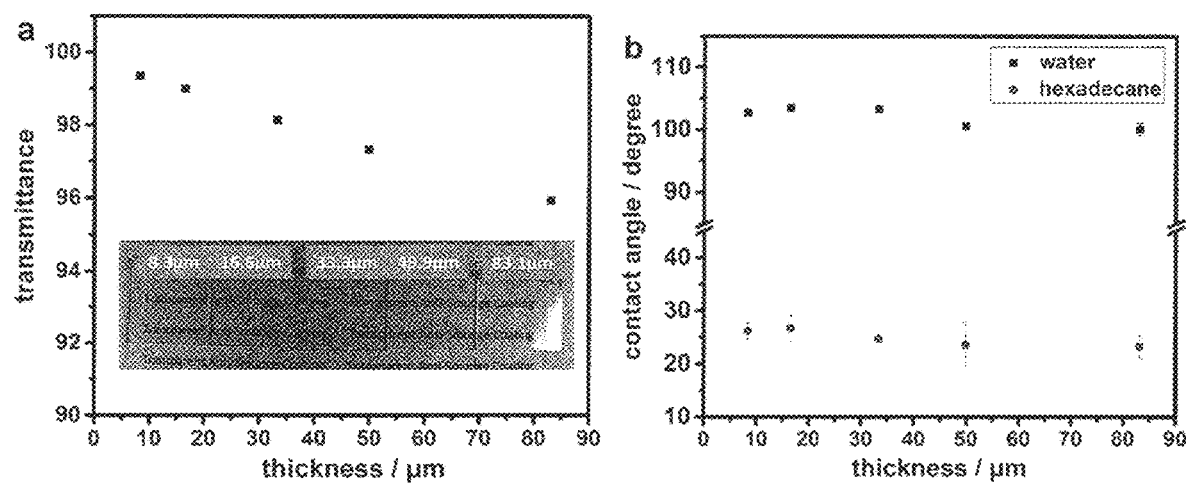
Fig. 15A-B

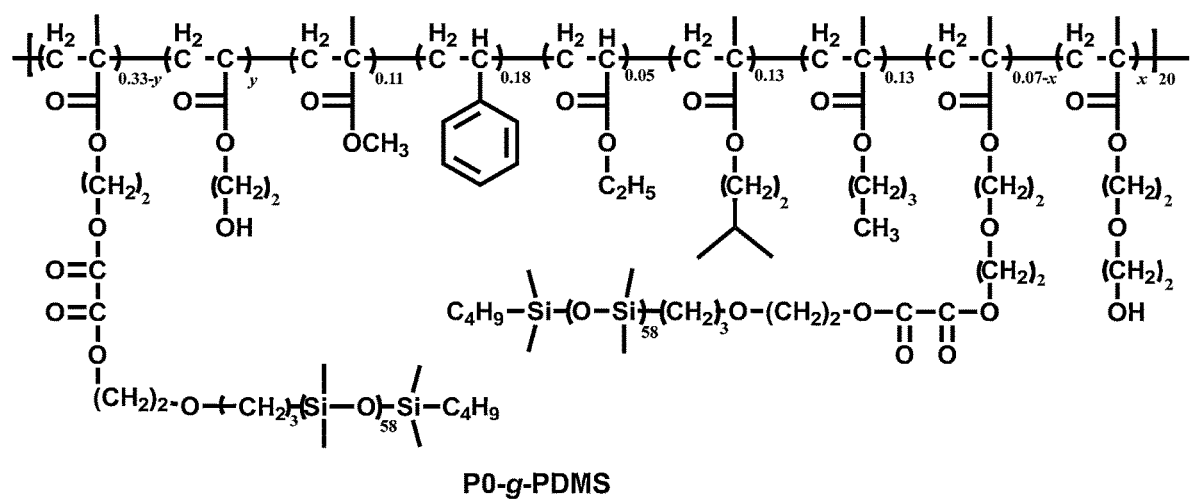
P0-g-PDMS
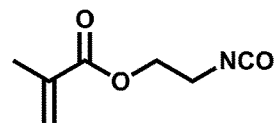
2-Isocyanatoethyl methacrylate
Fig. 18

UV-CURABLE ANTI-SMUDGE AND ANTI-GRAFFITI COMPOSITIONS

FIELD

The field of the invention is coatings and adhesives. More specifically, the field is coatings that are UV-curable, durable enough to endure wear, applicable to many different substrates, and repel water and oil.

BACKGROUND

Screens and surfaces of cell phones, tablets, and other hand-held electronic devices are susceptible to fingerprints and smudge deposition. The windows of high-rise buildings can develop stains due to dust deposition from rain or ice droplets. Automobile bodies and windshields become dirty from mud and dust. Such deposits affect the aesthetic appeal of objects and decrease our enjoyment. When these deposits accumulate on the screens of hand-held electronic devices or windows and windshields, they deteriorate display quality and diminish one's ability to use the device or to operate the vehicle. All these issues can be alleviated with anti-smudge coatings that are also optically clear and durable.

Currently, there are no durable, UV-curable, amphiphobic (oil- and water-repellent) and optically-clear coatings on the market for hand-held electronic devices, windshields, or the windows of high-rises. There is also a need for fluorine-free clear coatings.

Although thermal curing is convenient for many applications, it is problematic for application of a coating that has been applied to a heat-sensitive substrate, such as a touch-screen on a cellphone. For such thermally-sensitive applications, it is desirable to have a UV-curable coating that can be rapidly cured at room temperature.

SUMMARY

In an aspect, a composition is provided for forming a transparent, antismudge coating, that comprises a photoinitiator, a di-, tri-, or multi-functional monomer, and a graft copolymer bearing pendant double bonds and bearing PDMS, polyisobutyl or perfluorinated polyether side chains, wherein the composition is adapted to be applied to a substrate and cured by exposure to light to form a transparent, antismudge coating on the substrate. In one embodiment, the composition's di-, tri-, or multi-functional monomer comprises double bonds, epoxide groups, or a combination of double bonds and epoxide groups. In one embodiment, the composition's graft copolymer comprises pendant double bonds, epoxide groups or a combination. In one embodiment, the composition's graft copolymer comprises PDMS, PFPE, PEO, PIB, or PB. In one embodiment, the graft copolymer is P0II-g-PDMS, P0-g-PDMS, PEMA-g-PDMS, GPOSS-g-PDMS, VPOSS-g-PDMS, or MAPOSS-g-PDMS. In one embodiment, the composition's graft copolymer is P0II-g-PDMS, which has a structure as shown in FIG. 17.

In one embodiment, the di-, tri-, or multi-functional monomer comprises TM (see FIG. 20), CEOS, MAPOSS, GPOSS, VPOSS, or a combination thereof.

In one embodiment, the composition's functional monomer, TM, is prepared by reacting HEMA and HDIT in a ratio of 3:1. In one embodiment, the photoinitiator is 2-hydroxy-2-methylpropiophenone, benzoin, benzoin ethyl ether, benzoin methyl ether, 4,4'-dimethoxy benzoin, 4,4'-dimethylbenzil, 4'-tert-butyl-2', 6'-dimethylacetophenone, 2,2,-diethoxyacetophenone, 2,2-dimethoxy-2-phenylacetophenone, 4'-phenoxyacetophenone, benzophenone, 4-benzoxyl biphenyl, triarylsulfonium hexafluoroantimonate salts, (7-ethoxy-4-methylcoumarin-3-yl)phenyliodonium hexafluoroantimonate, (7-ethoxy-4-methylcoumarin-6-yl)]phenyliodonium hexafluoroantimonate, (7-ethoxy-4-methylcoumarin-3-yl)phenyliodonium hexafluorophosphate, (7-ethoxy-4-methylcoumarin-6-yl)]phenyliodonium hexafluorophosphate, [4-(2-hydroxytetradecyloxy)phenyl]phenyliodonium hexafluoroantimonate or a combination thereof.

In one embodiment, the photoinitiator is 2-hydroxy-2-methylpropiophenone. In an embodiment, the composition's graft copolymer comprises 30-40 wt % of PDMS. In an embodiment, the composition further comprises biocide, embedded particles selected from silica, titanium dioxide, diatomaceous earth, alumina, $TiO_2$, antioxidant, stabilizer, pigment, or a combination thereof.

In an aspect, a method is provided that comprises applying the composition of the above aspect to a substrate, curing the composition by exposure to UV light to form a coating, wherein the coating is transparent and antismudge.

In an aspect, a method is provided of making P0II-g-PDMS, comprising reacting P0-g-PDMS with 2-isocyanatoethyl methacrylate (see FIG. 18)

In an aspect, a cured coating is provided that comprises the composition of the above aspect and embodiments thereof.

In an aspect, a composition is provided for forming a transparent, antismudge coating, comprising a photoinitiator, and a graft copolymer bearing pendant double bonds and bearing PDMS, polyisobutylene or perfluorinated polyether side chains, wherein the composition is adapted to be applied to a substrate and cured by exposure to light to form a transparent, antismudge coating on the substrate.

In an aspect, a UV-curable antismudge epoxy coating is provided that comprises PEMA-g-PDMS, GPOSS-g-PDMS, VPOSS-g-PDMS, MAPOSS-g-PDMS, or a combination thereof.

BRIEF DESCRIPTION OF THE DRAWINGS

For a better understanding of the invention and to show more clearly how it may be carried into effect, reference will now be made by way of example to the accompanying drawings, which illustrate aspects and features according to embodiments of the present invention, and in which:

FIGS. 3A and 3B show variation in the static CAs and SAs of a) water and b) hexadecane as a function of the F3 coating irradiation time; also shown is the variation in the hardness of the coating as function of irradiation time.

FIG. 4 shows water contact angle variations as a function of time on F3 coatings that were irradiated for 5, 10, 30, and 300 s, respectively.

FIGS. 7A and B shows AFM phase images of a) the cross-section and b) the upper surface of a F3 coating cured for 300 s.

FIG. 8A shows variation in the transmittance at 500 nm for 32 μm cured F3 coatings as a function of the PDMS weight fraction in the coatings.

FIG. 8B shows variation of static CAs of water and hexadecane on the cured F3 coatings as a function of the PDMS weight fraction in the coatings.

FIGS. 10A-C show a) $^1$H NMR spectra of P0, graft polymer P0-g-PDMS and P0II-g-PDMS; b) GPC curves of P0, graft polymer P0-g-PDMS, and P0II-g-PDMS; and c) FTIR spectra of P0-g-PDMS before and after its reaction with 2-isocyanatoethyl methacrylate.

FIG. 11 shows a comparison of FTIR spectra of samples taken out from a HDIT and HEMA at a molar ratio of 1/3 that had been reacting for different times at 45° C.

FIG. 12A-C show FTIR spectra of F0, F2 and F3 coatings before and after UV curing with different formulations.

FIG. 13 shows FTIR spectra of the backside (bottom layer) of F3 films containing 2.5 wt % of PDMS at different irradiation times.

FIGS. 14A and 14B shows AFM a) topography and b) phase images of a cross-sectional surface of a F0 coating.

FIGS. 15A and B shows variations in the a) transmittance and b) contact angle of water and hexadecane of F3 coatings containing 2.5 wt % PDMS as a function of coating thickness.

FIG. 18 shows structural formula of P0-g-PDMS and 2-isocyanatoethyl methacrylate.

FIG. 25 shows the schematic of four coating formulations prepared as described below for F0, F1, F2 and F3.

DETAILED DESCRIPTION OF THE INVENTION

Definitions

Figure 1:
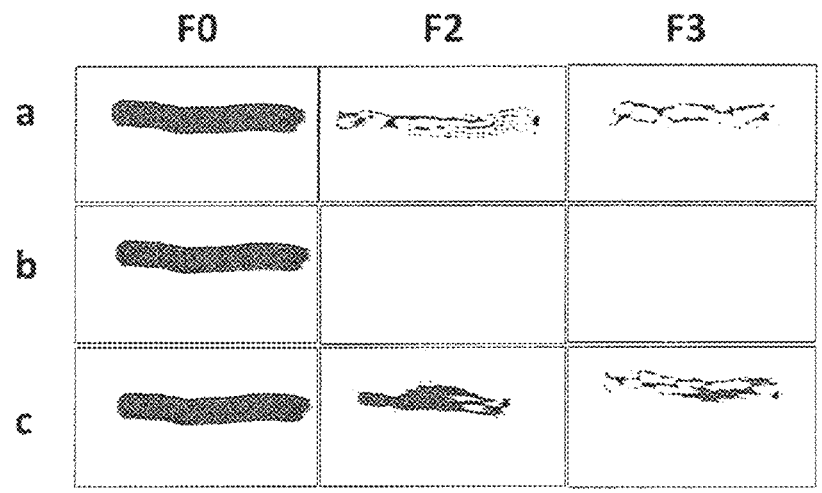
FIG. 1 shows a comparison of marker tests performed on F0, F2, and F3 coatings: a) Ink trace left on a pristine coating. b) Status of the ink trace after cleaning with Kimpwipes® tissue. c) Ink trace left from on F2-F4 coatings after writing on them the second time.

As used herein, the term "unsubstituted" refers to any open valence of an atom being occupied by hydrogen. Also, if an occupant of an open valence position on an atom is not specified then it is hydrogen.

As used herein, a "functional group" is a specific atom or group of atoms within a molecule that are responsible for characteristic chemical reactions. Thus functional groups are moieties within a molecule that are likely to participate in chemical reactions.

As used herein, "aliphatic" refers to hydrocarbon moieties that are straight chain, branched or cyclic, may be alkyl, alkenyl or alkynyl, and may be substituted or unsubstituted. "Short chain aliphatic" or "lower aliphatic" refers to $C_1$ to $C_4$ aliphatic. "Long chain aliphatic" or "higher aliphatic" refers to $C_5$ to $C_{25}$ aliphatic.

As used herein, an "amphiphobic" or "antismudge" material or surface is one that is both hydrophobic and oleophobic or lipophobic. In an embodiment, a material or surface is considered to be amphiphobic when drops of oil (i.e., hydrophobic liquid) and drops of water roll or slide readily off the material or surface when the material or surface is tilted from the horizontal position at an angle of 90 degrees or less. It should be understood that the term "amphiphobic" is not limited to repelling only water and oil. In certain embodiments, an amphiphobic material or surface will repel not only water and oil but also other substances, such as fingerprints, salt, acid, base, bacteria, etc.

As used herein, "heteroatom" refers to non-hydrogen and non-carbon atoms, such as, for example, O, S, P, and N.

As used herein, "polymer" refers to a large molecule, or macromolecule, composed of many repeated units.

As used herein, the term "copolymer" refers to a polymer having more than one type of monomer units. As used herein, the term "co" refers to copolymer.

As used herein, the term "transparent" refers to substantial clarity wherein at least some light can pass through.

As used herein, the term "grafted copolymer" refers to a copolymer with a linear backbone of one polymer and randomly distributed side chains of another polymer.

As used herein, the term "NP-GLIDE" refers to the observation that many test liquids have no problem to glide cleanly down such a coating at substrate tilt angles of less than 5°, and also that the coating contains nano-pools of a grafted liquid ingredient for dewetting enablement.

As used herein, the term "SLIPS" refers to slippery liquid-infused porous surface (SLIPS).

As used herein, the term "PDMS" refers to poly(dimethyl)siloxane.

As used herein, the term "DMF" refers to N,N-dimethylformamide.

As used herein, the term "DMC" refers to dimethyl carbonate.

As used herein, the term "GPC" refers to gel permeation chromatography.

As used herein, the term "MMA" refers to methyl methacrylate.

As used herein, the term "HDID" refers to dimeric hexamethylene diisocyanate.

As used herein, the term "HEMA" refers to 2-hydroxyethyl methacrylate.

As used herein, the term "HDIT" refers to hexamethylene diisocyanate trimer.

As used herein, the term "MAA" refers to methacrylic acid.

As used herein, the term "BMA" refers to butyl methacrylate.

As used herein, the term "iPMA" refers to isopentyl methacrylate.

As used herein, the term "VP" refers to vinyl propanoate.

As used herein, the term "HEGEMA" refers to 2-(hydroxyl ethylene glycol)ethyl methacrylate.

As used herein, the term "DM-PDMS" refers to a monomer bearing two double bond moieties and one PDMS chain.

As used herein, the term "PFPE" refers to perfluoropolyether, examples of PFPEs include PFPO, Demnum (available from Daikin), or Fluorolink (available from Solvay.

As used herein, the term "PEO" refers to poly (ethylene glycol) methyl ether.

As used herein, the term "PFPO" refers to poly(perfluoroisopropylene oxide).

As used herein, the term "PIB" refers to polyisobutylene.

As used herein, the term "PB" refers to polybutadiene.

As used herein, the term "ATRP" refers to atom transfer radical polymerization.

As used herein, the term "% T" refers to percent transmittance.

As used herein, the term "siloxane density" refers to the percentage of hydroxyl side chains that have been replaced by siloxane such as PDMS. For example, 11.3% siloxane density refers to a polymer wherein 88.7% of the hydroxyl groups remain, and 11.3% of the positions that were formerly hydroxyl are now occupied by PDMS chains.

As used herein, the term "SA" refers to sliding angle.

As used herein, the term "P0-g-PDMS" refers to polyol (P0) bearing a PDMS side chain. The term "P0II" denotes P0 after double bond introduction.

As used herein, the term "XPS" refers to X-ray photo-electron spectroscopy.

EMBODIMENTS

NP-GLIDE is a term used to refer to the observation that many test liquids have no problem to glide cleanly down a coated substrate with a tilt angle of less than 5°, and also refers to the point that the coating has nano-pools of a grafted liquid ingredient for dewetting enablement. Embodiments of the invention provide coating compositions that are capable of forming a UV-curable transparent coating that has oil- and water-repellent properties (i.e., antismudge). Current antismudge NP-GLIDE coatings cure at high temperatures, which is not appropriate for application on heat-sensitive substrates. Now, an NP-GLIDE coating that can be photo-cured at room temperature has been developed and tested.

A robust coating was obtained by combining three components, namely a (i) photo-initiator, (ii) a functional monomer, and (iii) a graft copolymer. The functional monomer includes double bonds, epoxide groups, or a combination of double bonds and epoxide groups. The graft copolymer bears pendent double bonds, epoxide groups, or a combination of double bonds and epoxide groups and it bears a side chain (e.g., PDMS, PFPE, PEO, PIB, PB, or a combination thereof) that provides an anti-smudge property. Coatings were prepared by casting films from a solution including the three components and then photolyzing the resultant films. A systematic study revealed that the liquid sliding property developed on a coating of lower crosslinking density than that required for ink to contract. Further, retaining the ability to contract ink traces after many writing and erasing cycles was the most demanding of the antismudge tests. For an optimized formulation, only 5 min of irradiation was required to yield a transparent coating with superior antismudge properties. Moreover, irradiating selected regions and then removing, with a solvent, reagents in the non-irradiated regions yield a surface with patterned wettability. These properties of the new photo-curable coating facilitate its applications.

(i) Photo-Initiator

The first of the three components is a photoinitiator. Examples of photoinitiators include 5. The composition of claim 1, wherein the photoinitiator is 2-hydroxy-2-methylpropiophenone, benzoin, benzoin ethyl ether, benzoin methyl ether, 4,4'-dimethoxy benzoin, 4,4'-dimethylbenzil, 4'-tert-butyl-2', 6'-dimethylacetophenone, 2,2,-diethoxyacetophenone, 2,2-dimethoxy-2-phenylacetophenone, 4'-phenoxyacetophenone, benzophenone, 4-benzoxyl biphenyl, triarylsulfonium hexafluoroantimonate salts, (7-ethoxy-4-methylcoumarin-3-yl)phenyliodonium hexafluoroantimonate, (7-ethoxy-4-methylcoumarin-6-yl)]phenyliodonium hexafluoroantimonate, (7-ethoxy-4-methylcoumarin-3-yl)phenyliodonium hexafluorophosphate, (7-ethoxy-4-methylcoumarin-6-yl)]phenyliodonium hexafluorophosphate, [4-(2-hydroxytetradecyloxy)phenyl] phenyliodonium hexafluoroantimonate or a combination thereof. Without wishing to be limited, an exemplary photoinitiator was used herein; it is 2-hydroxy-2-methylpropiophenone.

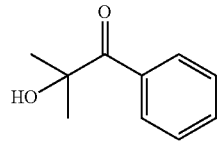

2-hydroxy-2-methylpropiophenone (ii) Functional Monomer

Figure 19:
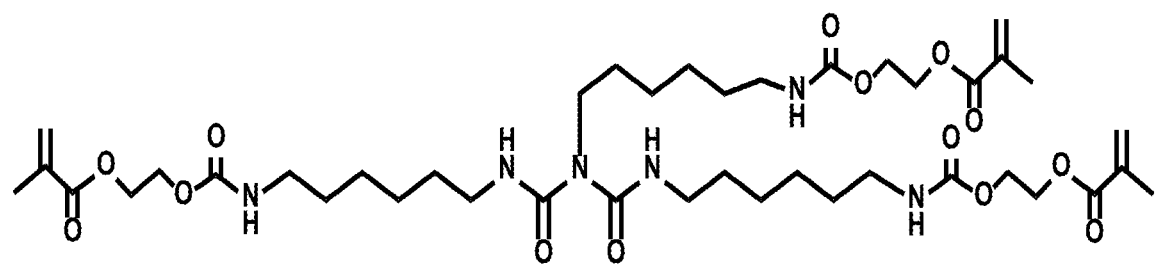
FIG. 19 shows a structural formula for an example of a liquid tri-functional monomer (TM) that was prepared from reacting 3 moles of 2-hydroxyethyl methacrylate (HEMA) with 1 mole of a hexamethylene diisocyanate trimer (HDIT).

As mentioned earlier, the di-, tri-, or multi-functional monomer includes double bonds, epoxide groups, or a combination of double bonds and epoxide groups. An exemplary liquid functional monomer was prepared and used in the examples described herein. Although it is a trimer (i.e., trifunctional monomer), it is also possible to use a di- or multi-functional monomer (e.g., dimer, trimer, tetramer, pentamer). The example liquid tri-functional monomer (TM) was prepared from reacting 3 moles of 2-hydroxyethyl methacrylate (HEMA) with 1 mole of a hexamethylene diisocyanate trimer (HDIT). See structural formulae of TM in FIG. 19.

(iii) Graft Copolymer

Figure 17:
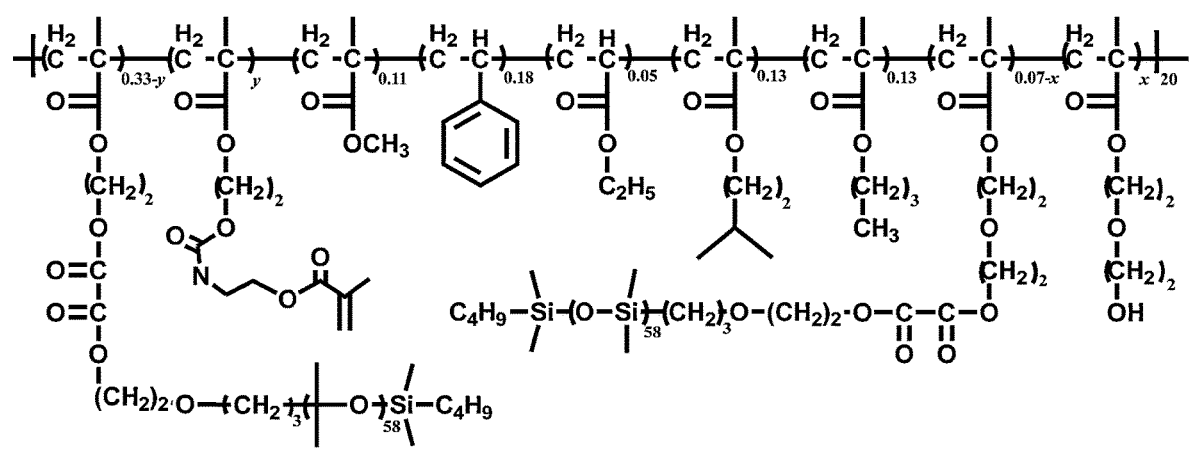
FIG. 17 shows structural formula of P0II-g-PDMS

One of the three components in the composition, the graft copolymer P0II-g-PDMS (see FIG. 17). (exemplary structure shown in FIG. 17), includes pendant double bonds (i.e., vinyl units), epoxide groups, or a combination of double bonds and epoxide groups, and includes sidechains that include a moiety that provides an antismudge character, namely a polysiloxane, polyisobutyl or perfluorinated polyether side chains (e.g., PDMS, polysiloxane, PFPE, PEO, PIB, or PB moiety).

The vinyl units were used to photo-initiate free radical polymerization to cure the composition and form a NP-GLIDE coating. A P0-g-PDMS was derivatized, so that double bonds were introduced to the P0 backbone by reacting hydroxyl groups of P0 with 2-isocyanatoethyl methacrylate to yield P0II-g-PDMS, where P0II denotes P0 after double bond introduction.

Fluorinated compounds have been previously incorporated into UV-curable formulations to enhance the chemical resistance of the resultant coatings. However, most prior studies failed to go beyond reporting the static contact angles of several liquids in the characterization of the wetting properties of the final products. Seldom reported is contraction of ink and paint traces, which is more challenging to achieve than liquid sliding but deemed an essential qualification for an anti-smudge coating. In previous reports, when PDMS was used, it was bound to the coating matrix by both ends, which did not facilitate the formation of an enriched PDMS brush layer. Thus, no anti-smudge properties were reported for those systems despite the report of improved water repellency. NP-GLIDE coatings have no problems with gliding different test liquids. Their PDMS chains were grafted via only one end to a coating surface and helped convert a crosslinked solid coating surface into a slippery liquid-like one.

In a previous study, NP-GLIDE coatings maintained their antismudge properties even after their surfaces were much abraded. This durability was attributed to the ability of NP-GLIDE surfaces to self-regenerate: when the surface layer was worn away, nanopools that were initially embedded underneath were ruptured and chains of the freshly released liquid polymer replenished the worn surface. In the case of a SLIPS, the pores of a pre-made porous surface are filled with a low-surface-tension liquid. An NP-GLIDE coating differs from a SLIPS because the liquid anti-smudge agent is covalently attached to the coating matrix and a grafted anti-smudge agent should be less prone to loss by evaporation or leaching.[3]

To prepare a coating, a particular formulation was diluted with DMC and DMF before the photoinitiator 2-hydroxy-2-methylpropiophenone was added. DMC and DMF which were selectively poor for PDMS were used to facilitate the formation of micelles from P0II-g-PDMS. Micelle formation helped hide PDMS in the cores and has been shown to improve the compatibility of the system during coating formation and to facilitate the uniform distribution of the PDMS nanopools throughout the coating matrix. Solvents were subsequently left to evaporate in an oven under a gentle nitrogen flow overnight before the coatings were fully cured via irradiation with UV light for 5.0 min. For comparison purposes, all coatings were 32 μm thick and contained 5.0 wt % of the photoinitiator and 2.5 wt % of PDMS.

As shown in the schematic in FIG. 25, four coating formulations were prepared and tested.

As shown in the above schematic, four coating formulations were prepared and tested. An F0 coating included TM. An F1 coating included TM and difunctional monomer bound to PDMS (DM-PDMS). An F2 coating included P0II and P0II-g-PDMS. An F3 coating included TM, and P0II-g-PDMS.

The F1 formulation after casting on a glass plate and solvent evaporation was opaque and the coating remained so after photolysis, suggesting that macrophase separation occurred in this system. Macrophase separation occurred probably because the HEMA-bearing arms of the dimer were not sufficiently thick or large to isolate PDMS into individual nanopools but allowed the different PDMS nanodomains to overlap. Because of sample opacity, the F1 coatings were not further characterized.

The F2 and F3 coatings appeared clear both before and after sample photocuring. The clarity of the cured coatings is seen from the high transmittance values for 500 nm light (see Table 1). The high transparency of the F2 coatings is perhaps due to the ability of the large P0II backbone to prevent the grafted PDMS side chains from undergoing macrophase separation and due to the compatibility between P0II and the P0II backbone of P0II-g-PDMS. P0II-g-PDMS did not undergo macrophase separation from crosslinked TM in F3 coatings probably partially because of the moderate compatibility between P0II and crosslinked TM and partially because of rapid crosslinking between TM and P0II backbone under photolysis.

Clear F2 and F3 coatings were further characterized by measuring static contact angles of 5 μL water and hexadecane droplets as well as sliding angles of 5 μL hexadecane and 20 μL water droplets on these surfaces. The contact angles of hexadecane and water were higher on the F2 and F3 coatings than on the F0 coating (see Table 1). This increase is perhaps due to the enrichment of the surfaces of the latter two coatings by the low-surface-tension PDMS chains. As the surface tension $\gamma_c$ of the coating surface decreased, test liquids spread less on the coating and their contact angle θ increased according to Young's equation:

$$\cos\theta = \frac{\gamma_C - \gamma_{LC}}{\gamma} \quad (1)$$

where γ is the tension of the test liquid, and $\gamma_{LC}$ is the interfacial tension between the test liquid and the coating.

While neither hexadecane nor water glided down the F0 coating as intact droplets, these liquids slid down F2 and F3 coatings cleanly. In the case of 5 μL hexadecane droplets, the measured sliding angles (SAs) were lower than 3°. Thus, hexadecane sliding was facile on these coatings. Water droplets with a volume of 20 μL also slid on the substrate at a tilt angles of 66±4°. Therefore, PDMS incorporation enhanced the liquid sliding properties of the base coatings.

F2 and F3 coatings were also subjected to an ink contraction test. While a red ink containing ethyl alcohol and ethylene glycol monobutyl ether as the solvent left a continuous mark on the F0 coating (see FIG. 1), the ink shrank on both the F2 and F3 coatings. Additionally, the ink traces could be readily wiped off with a Kimwipes® tissue from the F2 and F3 coatings. However, the traces could not be removed under identical conditions from the F0 coating. Thus, both F2 and F3 exhibit anti-smudge behavior.

The ink contraction experiment was repeated on a previously marked region on the F2 and F3 coatings. Surprisingly, the ink contracting ability on the F2 coating diminished. On the other hand, the ink contracting ability remained on the F3 coating after 30 writing and erasing cycles. Thus, only the F3 formulation afforded a robust NP-GLIDE coating.

Figure 2:
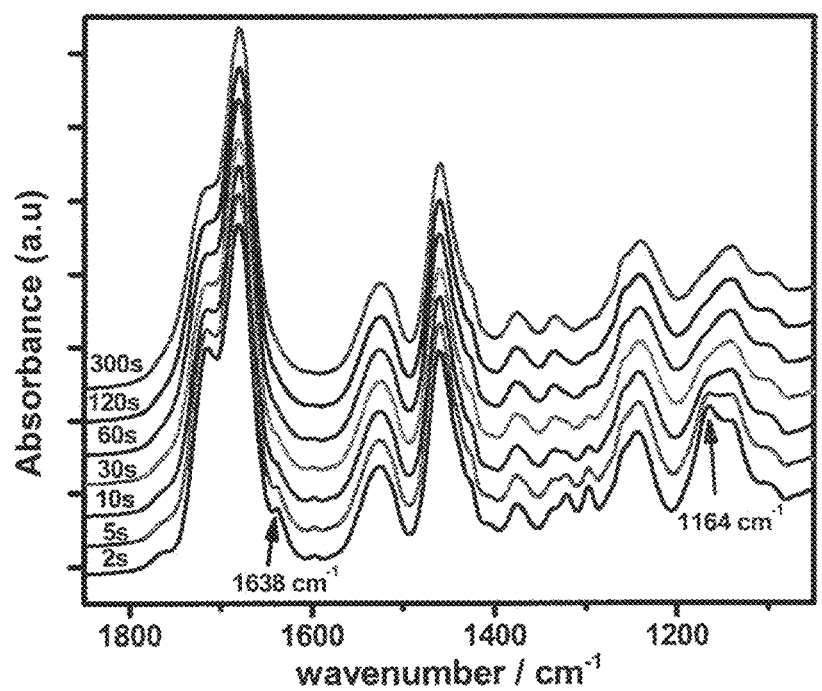
FIG. 2 shows a comparison of FTIR spectra of a F3 coating that was irradiated for specified different periods of time.

The surprising difference between the F2 and F3 coatings suggests that the formulation of a robust NP-GLIDE coating is not as straightforward as we had originally envisioned. The ink contracting performance noticeably diminished on the F2 coating after writing erasure, probably because the exposed PDMS was mostly wiped off the surface together with the ink during the ink removal step. This behavior suggested that the exposed PDMS chains were not tightly bound to the coating matrix in this case. The wetting behavior of the F3 coating was studied as a function of its radiation time to establish the conditions for robust NP-GLIDE coatings. FIG. 2 compares the FTIR spectra of a F3 sample that was irradiated for different periods of time. While the marked peak at 1638 cm$^{-1}$ in FIG. 2 corresponds to the C=C stretching of the HEMA double bonds, the peak at 1164 cm$^{-1}$ arises from the stretching of the CO—O bond in the —OOC—C(CH$_3$)=CH$_2$ group. The intensities of these two peaks decreased rapidly during the initial 30 s of irradiation. After 60 s, further decreases in the intensities of these peaks became barely noticeable. Thus, the F3 coating was rapidly cured, which is typical for most UV curable formulations.

As irradiation progressed, the hardness of the coating increased. FIGS. 3A and B show how the hardness measured using a series of pencils invoking the ASTM D3363 protocol varied with irradiation time for the F3 coating samples. Below the photolysis time of 10 s, the coating was softer than the softest pencil with the hardness designation of 9B. A measurable hardness of 8B was seen only by the photolysis time of 30 s. The hardness eventually reached 3H by the photolysis time of 300 s.

As coating hardness increased, the rate of surface reconstruction diminished. FIG. 4 shows a plot of how the water contact angle varied with their sitting time on coating samples that had been irradiated for various times. The water contact angles on the sample irradiated for 5 s rapidly decreased to approach 73±1°, the static water contact angle on a crosslinked F0 coating. This result suggests the ability for the more hydrophobic PDMS that was initially in contact with water to recede into the coating matrix, thus exposing the lightly crosslinked TM component. Surface reconstruction was also observed on the coating that was irradiated for 10 s. Meanwhile, no significant surface reconstruction was observed on the coatings that were irradiated for 30 and 300 s.

Referring to FIG. 3a, a plot is shown of variation in the static or equilibrium water contact angles, measured 5 min after droplet dispensing, as a function of time that was used to irradiate F3 coating samples. The contact angle increased steeply with time between 5 and 30 s and plateaued after 60 s. These trends were consistent with those observed for the double bond conversion data obtained via FTIR characterization, suggesting that double bond crosslinking was essential for impeding surface reconstruction.

FIG. 3a also plots the variation in the SAs of 30-μL water droplets as a function of F3 irradiation time. The SA variation trend contradicted the contact angle variation trend, i.e. the SA decreased as photolysis time increased and levelled off above the photolysis time of 120 s.

Referring to FIG. 3b, water contact angle variation trend also contrasted with that exhibited by the hexadecane contact angles. At shorter irradiation times, the hexadecane CAs were higher. They decreased with irradiation time initially and plateaued after 60 s. The higher CAs at shorter irradiation times might be due to the migration of the PDMS component to the surface under a hexadecane droplet, which should be more compatible with PDMS but helped increase hexadecane contact angles.

At irradiation times shorter than 30 s, hexadecane spread on the coatings. It started to glide down cleanly only on samples that were irradiated for 30 s and longer. The SA plateaued only after the irradiation time exceeded 120 s (FIG. 3b).

Figure 5:
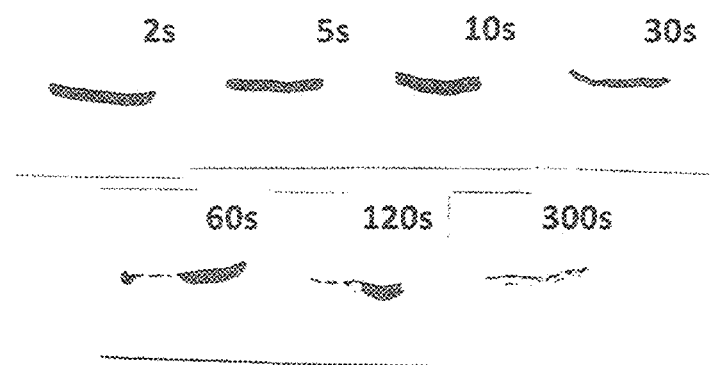
FIG. 5 shows ink traces left on F3 coatings that were irradiated for 2, 5, 10, 30, 60, 120, and 300 s.

An ink contraction test was performed on samples irradiated for different periods of time and the results are shown in FIG. 5. No ink contraction was observed on samples that were irradiated for less than 30 s. The ink contraction capability further improved only beyond the irradiation time of 30 s and excelled at the irradiation time of 300 s. The data discussed above suggest that the contact angles and SAs plateaued at shorter photolysis times than that required for the emergence of the ink shrinking behavior. Thus, ink shrinking is a more challenging test than the liquid contact angle and SA tests. While liquid contact angle and SA values have often been reported in the past, high contact angle values and clean liquid sliding do not automatically indicate that a coating possesses anti-smudge properties. This study suggests that a high degree of coating crosslinking is essential for achieving a robust and full-fledged anti-smudge coating.

Figure 6:
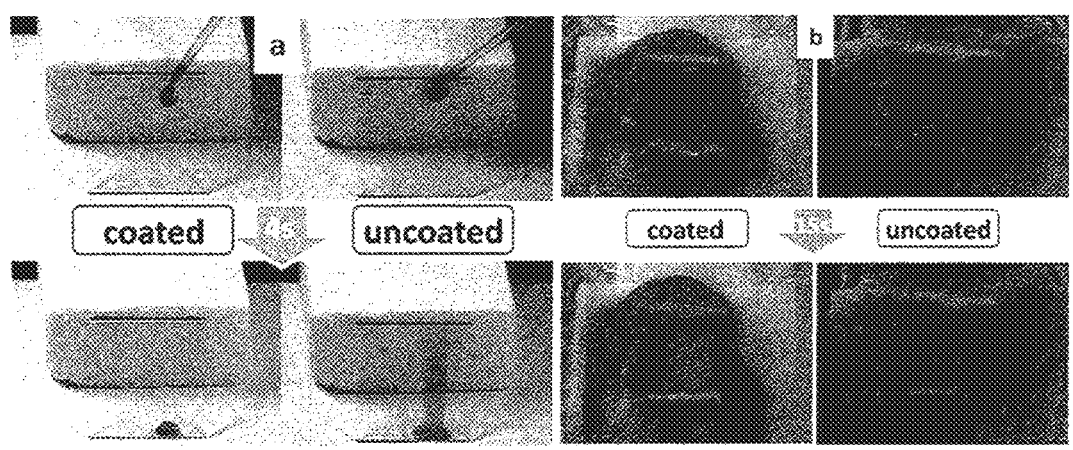
FIG. 6A shows photographs demonstrating the clean sliding of dyed hexadecane on a F3-coated glass slide in contrast with the spreading on an uncoated slide.
FIG. 6B shows photographs showing the contraction of a red paint on a F3-coated glass slide while this paint covered an uncoated slide.

F3 coatings that had been irradiated for 300 s were robust. FIG. 6a compares photographs taken of dyed hexadecane droplets that were immediately and 4 s after their dispense on an uncoated and a F3-coated glass plate. By 4 s, the droplet had cleanly slid down the F3-coated plate. On the other hand, the droplet spread on the uncoated plate. Other organic solvents including diiodomethane, decane, and dodecane, which had surface tensions of 50.8, 23.8, and 25.4 mN/m also cleanly glided down these coatings, exhibiting respective SAs of 12±2°, 2±1°, and 2±1° for 5 μL droplets. Such coatings are expected to be similar to the PDMS-containing PU- or epoxy-based coatings that have been examined in the past and thus they should repel all liquids with surface tensions above ~23 mN/m.

The SA of 66±4° for 20-μL droplets on F3 containing 2.5 wt % of PDMS was substantially higher than those of polyurethane or epoxy-based NP-GLIDE coatings. To gain insight into this, this coating was analyzed by XPS. A Si atomic abundance of 6.2% on the coating surface was determined. This value was significantly lower than 11.7% reported for a NP-GLIDE PU coating that had a bulk PDMS content of 9.0 wt %[1] or than 14.9% reported for a NP-GLIDE epoxy coating that had a bulk PDMS content of 7.4 wt %.[2] Indeed, the F3 coating had a lower PDMS bulk content of 2.5 wt %. To examine the effect of increasing the bulk PDMS content, another F3 coating that contained 5.0 wt % of PDMS was prepared. The SA determined for 20 μL water droplets was still 67±2°, which was the same as 66±4° on the F3 coating containing 2.5 wt % of PDMS. Thus, it is postulated that the surface PDMS content was already saturated by the bulk PDMS content of 2.5 wt % and did not further increase with bulk PDMS content beyond this value. It is also speculated that the surface PDMS content difference between the current coating and the prior NP-GLIDE coatings probably arose from the different curing protocols used and the different coating compositions.

In other studies, F3 formulation including 2.5 wt % PDMS was subjected to thermal curing at 170° C. for 2 h. On this thermally cured coating, the SA of 20 μL water droplets was decreased to 41±1°, suggesting an increased extent of PDMS surface chain segregation.

A more effective method to promote water sliding is to incorporate some free PDMS into a NP-GLIDE coating and to prepare a silicone-infused UV-curable NP-GLIDE coating. The infused free silicone increases the surface coverage by PDMS because it, unlike P0II-g-PDMS, does not contain a tethering P0II backbone that competes with PDMS for surface sites.

Despite the water SA, the F3 coating readily contracted paint sprays. FIG. 6b compares the behavior of a commercial red paint after its application onto a fully cured F3 coating and onto a glass glide. After 15 s, the paint was seen to have almost fully contracted on the F3-coated glass slide. However, the uncoated plate remained covered by the paint by this time and thereafter.

Referring to FIG. 7, nanopool-containing structure of the F3 coating was confirmed via atomic force microscopy (AFM). FIG. 7 shows a comparison of phase images of a cross section and an upper surface of a cured F3 coating containing 5.0 wt % of PDMS, where the cross-section was obtained by microtoming a cured sample. FIG. 7a clearly shows the existence of nanopools in the coating matrix. FIG. 7b shows a nanopool structure on the surface of the coating. The surface had a biphasic structure and one component had to be PDMS, because Si was seen on the surface by XPS and the surface demonstrated antismudge properties.

The small diameters of the PDMS nanopools dictated that the coatings did not scatter much light and were highly transparent. Referring to FIG. 8a, plots are shown indicating how transmittance of 500 nm light through 32 μm coatings varied as a function of PDMS content. The transmittance was high (above 96%) even at a PDMS content of 5.0 wt %. The optical clarity can also be appreciated from the insert shown in FIG. 8a where coatings containing different PDMS weight fractions were placed onto written text. It is possible to discern text beneath the coatings in each case.

Referring to FIG. 8b, contact angles of water and hexadecane were measured on F3 coatings at different PDMS contents and results were plotted. The contact angles did not change significantly with PDMS bulk content when it exceeded 0.50 wt %. In contrast, the contact angles of these two test liquids on a series of NP-GLIDE epoxy coatings did not plateau until the bulk PDMS content surpassed 4.0 wt %.[2] Thus, PDMS readily self-enriched on the coating surface in the current UV-curable system. However, the equilibrium surface PDMS content as revealed from the contact angle values and XPS data was not as high as in the thermally-cured epoxy system.

An anticipated advantage of a UV-curable NP-GLIDE formulation is the creation of surfaces with patterned wettability. To demonstrate this, letters Q and U and as well as star and moon symbols were cut into aluminum foils. These masks were then placed between a UV lamp and the films and masked samples were irradiated. After 5 min of irradiation, the samples were then rinsed with acetone to remove the non-irradiated regions. Upon drying, each plate was scribbled on multiple times with a marker so that the ink covered and surrounded the irradiated region. This treatment yielded the results shown in FIG. 9.

Figure 9:
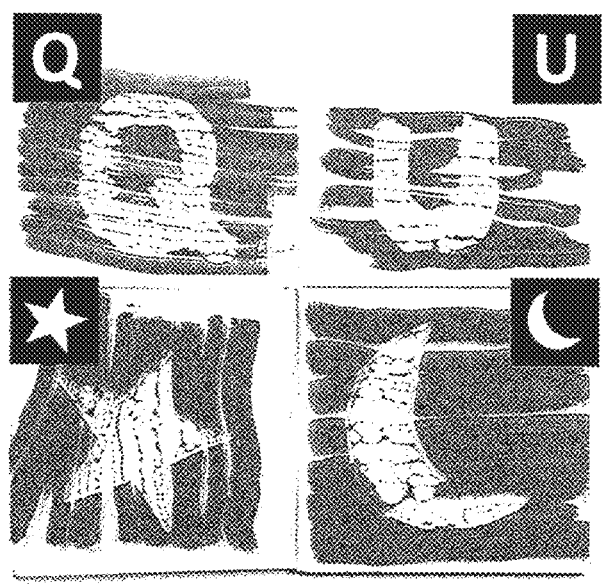
FIG. 9 shows anti-smudge patterns generated on glass plates after their coatings were irradiated with light passing through the photomasks (shown as inserts) and the coating precursor in the non-irradiated regions were removed with acetone. The patterns were revealed by multiple marker stokes that eventually surrounded the non-irradiated regions but contracted in the crosslinked regions.

Referring to FIG. 9, anti-smudge patterns are shown that were created on glass plates. Reagents in the irradiated regions underwent crosslinking and were not rinsed away by acetone. In contrast with the surrounding regions that were not irradiated, these crosslinked regions exhibited antismudge behavior.

Referring to FIGS. 10A-C, $^1$H NMR spectra, and GPC curves are shown for P0, graft polymer P0-g-PDMS, and P0II-g-PDMS; and FTIR spectra are shown for P0-g-PDMS before and after its reaction with 2-isocyanatoethyl methacrylate.

Referring to FIG. 11, a comparison is shown of FTIR spectra of samples taken out from a HDIT and HEMA at a molar ratio of 1/3 that had been reacting for different times at 45° C.

Referring to FIGS. 12A-C show FTIR spectra of F0, F2 and F3 coatings before and after UV curing with different formulations.

Referring to FIG. 13, FTIR spectra are shown of the backside of F3 films containing 2.5 wt % of PDMS at different irradiation times.

Referring to FIGS. 14A-B, AFM topography and phase images are shown of a cross-sectional surface of a F0 coating.

Referring to FIGS. 15A-B, variations in the transmittance and contact angle are shown of water and hexadecane of F3 coatings containing 2.5 wt % PDMS as a function of coating thickness.

Reacting a limiting amount of PDMS-OH with HDIT and the residual isocyanate groups with HEMA yielded a mixture of DM-PDMS and TM. Mostly TM was prepared by reacting HEMA with HDIT at a molar ratio of 3.21/1.00. Furthermore, P0II or P0II-g-PDMS was prepared by reacting a polyol P0 with 2-cyanatoethyl methacrylate or with PDMS-COCl and 2-cyanatoethyl methacrylate, respectively. Formulations including DM-PDMS and TM (F1), P0II-g-PDMS and P0II (F2), or P0II-g-PDMS and TM (F3) were then cast along with 2-hydroxy-2-methylpropiophenone to yield films on glass plates. These films were subsequently vitrified via photolysis. The F1 coatings were cloudy probably due to the inability of the small DM head groups to prevent different PDMS domains from overlapping and forming PDMS-rich macrodomains. Meanwhile, the F2 coatings were optically clear but readily lost their ink shrinking ability after a single writing and erasing cycle. Only the F3 formulation yielded transparent robust antismudge coatings that withstood more than 30 writing and erasing cycles, suggesting that the bonding between P0II-g-PDMS and the crosslinked TM matrix was stronger than that between P0II-g-PDMS and the crosslinked P0II matrix.

A F3 formulation containing 2.5 wt % PDMS was photocrosslinked to different degrees and the evolution of its wetting performance was monitored as a function of irradiation time. This systematic study revealed that the hexadecane and water CA and SA values plateaued at irradiation times longer than 60 s. However, full-fledged ink contraction ability developed only by irradiation time of ~300 s. Thus, the ink contraction test is more stringent than the contact angle and SA tests.

The P0II-g-PDMS and TM coating possessed the transparency, internal structure, as well as ink and paint contraction capabilities that are desired of an NP-GLIDE coating. More importantly, the coating could be irradiated under masks and then developed (via removal of the uncrosslinked polymer) to yield crosslinked domains with patterned wettability. We anticipate practical applications for the developed UV-curable antismudge coating and believe in the guidance value of lessons learned from this study.

In summary, a NP-GLIDE coating that can be photo-cured at room temperature has been developed. Of the various formulations that have been tested, robust coatings were obtained from combining a photo-initiator, a trifunctional monomer, and a graft copolymer. The graft copolymer bears pendent double bonds and a PDMS side chain, which is an antismudge agent. Coatings were prepared by casting films from a solution of these three components and then photolyzing the resultant films. As described in the Working Examples, the monomer component included such representative examples as TM, CEOS, MAPOSS, GPOSS, and VPOSS; and the graft copolymer component included such representative examples as P0II-g-PDMS, P0-g-PDMS, PEMA-g-PDMS, GPOSS-g-PDMS, VPOSS-g-PDMS, and MAPOSS-g-PDMS.

A systematic study revealed that the liquid sliding property developed on the coating at a lower crosslinking density than that required for ink to contract. Further, retaining the ability to contract ink traces after many writing and erasing cycles was the most demanding of the three antismudge tests. Only 5 min of irradiation was required to yield a transparent coating with superior antismudge properties. Moreover, irradiating selected regions and then cleaning non-irradiated regions yielded a surface with patterned wettability. This photo-curable antismudge coating thus has advantageous properties.

WORKING EXAMPLES

Materials. 2-Hydroxyethyl methacrylate (HEMA, 97%, Aldrich), oxalyl chloride $(COCl)_2$, (98.0%, Aldrich), 2-isocyanatoethyl methacrylate (98%, Aldrich), dibutyltin dilaurate (95%, Aldrich), 2-hydroxy-2-methylpropiophenone (97%, Aldrich), butyl acetate (99.5%, Aldrich), dimethyl carbonate (99%, Aldrich), anhydrous chloroform (99%, Aldrich), N,N-dimethylformamide (99%, Aldrich), and monocarbinol-terminated poly(dimethylsiloxane) (PDMS-OH, Mn ~5000, Gelest) were used as received. The polyol precursor and hexamethylene diisocyanate trimer (HDIT) were supplied by a proprietary manufacturer. Fisherbrand Microscopic Slides (7.62 cm×2.54 cm) were cut into the desired sizes and then used after cleaning with acetone and drying. Sharpie™ MAGNUM permanent marker and ColorMaster™ KRYLON Banner Red paint were used as received.

$^1$H NMR spectra of all the polymers were recorded on a Bruker Avance-300 using 128 scans and a relaxation delay of 3 s. Dimethyl Sulphoxide-$d_6$ (DMSO-$d_6$) was used as solvent. Size Exclusion Chromatography (SEC) analysis of all the polymers were performed on a Wyatt instrument equipped with refractive index detector (Wayatt: Optilab T-rEX) and three columns (MZ-Analysentechnik: MZ-Gel SDplus 10E5 Å, MZ-Gel SDplus 10E4 Å, MZ-Gel SDplus 500 Å) in series. Chloroform was used as eluent and SEC systems were calibrated with narrowly dispersed polystyrene (PS) standards. FTIR spectra of all the polymers and monomers were recorded on a Bruker Alpha instrument (Platinlim ATR).

Poly(ethylene-co-maleic anhydride) (average Mw=1.0× $10^5$-5.0×$10^5$ Da) was purchased from Aldrich. Monoaminopropyl terminated polydimethylsiloxane (PDMS-$NH_2$) with molecular weight of 2.0×$10^3$ Da was purchased from Gelest (Morrisville, PA, USA). 2-(3,4-epoxycyclohexyl)ethyltrimethoxysilane (ECTMS), N-methyl-2-pyrrolidone (NMP) and acetone were purchased from Aldrich. Microscope glass slides (Fisherbrand® 7.62 cm×2.54 cm) were cut into 2.54 cm×2.54 cm square pieces before use.

Monoaminopropyl terminated polydimethylsiloxane, asymmetric (PDMS-$NH_2$, Gelest, 95%, Mn=800-1000 g/mol), triarylsulfonium hexafluoroantimonate salts, mixed, 50 wt. % in propylene carbonate (Aldrich), glycidyl polyhedral oligomeric silsesquioxane cage mixture (glycidyl POSS, Hybrid), butanone (Aldrich), butyl acetate (Aldrich), propylene carbonate (Aldrich) was used as received.

Example 1a. Synthesis of P0-g-PDMS

P0-g-PDMS was synthesized in two steps following procedures reported previously (Burel, F. et al., *Thermochim. Acta* 1999, 326, 133-141). To prepare PDMS-COCl in step one, PDMS-OH (4.0 mL, density=0.97 g/mL) was dissolved in anhydrous chloroform (15 mL). Then the solution was injected into oxalyl chloride (4.0 mL) with stirring at room temperature. After 12 h, the reacted mixture was vacuumed at room temperature for 1 h and then 60° C. for 6 h to remove unreacted oxalyl chloride and other volatile impurities, yielding PDMS-COCl as a clear liquid.

In the second step, PDMS-COCl was grafted onto a commercial polyol. The polyol was supplied as a solution. To remove the solvent, the solution was added into excess hexanes to precipitate the polymer and the solid polymer was then dried in vacuum at 60° C. for 12 h. To prepare the graft copolymer, the solid polyol (8.0 g) was dissolved in 30 mL of anhydrous chloroform before the PDMS-COCl sample, now dissolved in 10 mL of anhydrous chloroform was added dropwise into the P0 solution under stirring. The mixture was left to react for another 12 h. The final graft polymer P0-g-PDMS was obtained as a whitish paste after solvent evaporation.

Example 1b. Synthesis of P0II-g-PDMS

Double bonds were grafted onto P0-g-PDMS by reacting 2-isocyanatoethyl methacrylate with the hydroxyl groups of P0-g-PDMS. To accomplish this, P0-g-PDMS (0.50 g, 0.96 mmol OH) was dissolved in butyl acetate (4.35 g) before 2-isocyanatoethyl methacrylate (0.15 g, 0.93 mmol) was added. After addition of dibutyltin dilaurate (2 µL), the mixture was left to react for 2 h at 45° C. with stirring. The final polymer for characterization was obtained by evaporating all the volatile components. For long term storage, P0II-g-PDMS was stored in butyl acetate solution at the concentration of 10.0 wt %.

Example 1c. Synthesis of P0II

P0II was synthesized following the protocol described above for attaching HEM to P0-g-PDMS.

Example 1d. Synthesis of Trifunctional Monomer (TM)

Trifunctional monomer was synthesized according to a literature method (Burel, F. et al., *Thermochim. Acta* 1999, 326, 133-141). HDIT (16.7 mmol existing in 10.0 g of a 80 wt % mixture in butyl acetate at a density of 1.08 g/mL) and 2-hydroxyethyl methacrylate (7.0 g, 53.8 mmol) were mixed together and then dibutyltin dilaurate (5.0 µL) was added into the mixture. The mixture was stirred at 45° C. for more than 2 h to yield the final product in the form of a clear liquid.

Example 2. Coating Preparation

Table S1 gives the recipes used to prepare various coatings. To prepare a coating that is 32 µm thick, 175 µL of a coating solution (weight of the coating forming components equaled 25 mg) was cast on a leveled 1.0 inch×1.0 inch glass slide. Coatings of different thicknesses were obtained by adjusting the amounts of the coating solution cast on glass slides of the area of 1.0 inch×1.0 inch. To prepare coatings with different PDMS weight fractions, the weight ratio between P0II-g-PDMS and TM or P0II was adjusted but the total concentration for the coating-forming components was kept constant. Control coatings were prepared analogously making use of the same casting solvent mixtures.

After the coatings were dried in an oven for 12 h at room temperature under blown N2, the coated plates were placed on a mirror and exposed to a medium pressure mercury lamp in an Oriel 6140 lamp housing powered by an Oriel 6128 power supply. A filter with a cut-off wavelength of 270 nm was used to remove deep UV light. All the coatings were cured under irradiation for 5 min except when samples that were not fully cured were required for investigating the curing process.

Example 3. Curing of Coating

The curing process of the coatings were monitored by FTIR (Bruker Alpha instrument Platinlim ATR). Even only irradiated 2 s, a film was formed which could be peeled from the glass slide by using a blade to gradually detach the coating. Thus, all the samples for FTIR experiments were peeled from glass slides after UV irradiation. Both the surface facing air and the surface originally in contact with glass were characterized by ATR FTIR.

Example 4a. Transmittance Measurement

Transmission curves of coated glass plates in the range of 400-800 nm were recorded using a Varian CARY 300 Bio UV-Visible spectrometer. An uncoated glass slide was used as the reference. There was no absorbance at the wave length of 500 nm. The reported transmission value (1) at 500 nm for each formulation was the average of at least three samples and in at least three locations for each sample.

Example 4b. Contact and Sliding Angle Measurements

A DataPhysics OCA 15 Pro Optical instrument was used to measure the static contact angles and sliding angles. For static contact angle measurements, 5 μL test liquid drop was dispensed on the coating surface and then the shape of the drop was record to analyze its contact angle. To determine the sliding angles, 5 μL hexadecane and 20 μL water were first dispensed on a coating on the stage that was leveled. The tilting angle of the stage was then increased at 0.38°/sec. The sliding angle was defined as the minimal stage tilting angle for a test droplet to slide.

Example 4c. Antismudge Property Tests

To demonstrate the anti-smudge property of the coatings, three tests were performed. The first involved the clean sliding of hexadecane and water droplets. To facilitate viewing of the moving water droplets, hexadecane and water used were dyed with Red Oil 0 and Parker Quink ink, respectively, and the droplet sizes were at 10 μL or 20 μL, individually. To show contraction of oil based ink traces, Sharpie™ MAGNUM permanent marker was used. To show contraction of a paint, ColorMaster™ KRYLON Banner Red paint manufactured by Krylon Products Group was painted directly on a coated glass slide. All the experiment processes were recorded by video.

Example 4d. Hardness Test

Hardness of the coating was graded by pencil test documented in ASTM protocol D3363. Pencils with hardness from 9B to 9H were purchased from Derwent's. Before test all the pencils were sharpened and then flattened by rubbing on abrasive paper (grit No. 400) at a 90° angle to create a flat, smooth and circular cross section. Then pencils with different hardness were hold at a 45° angle against the coating surface and pushed away from the operator.

Example 4e. Antismudge Patterns

Before UV irradiation, the coated glass slide was masked by desired pattern and then irradiated for 5 mins. The mask was made from aluminum foils with hollow pattern in the center. The cured sample was washed by running acetone stream for 20 seconds to remove the uncrosslinked polymers and monomers. When the sample was dried completely it was used for further characterization.

Example 4f. XPS Analysis

Figure 16:
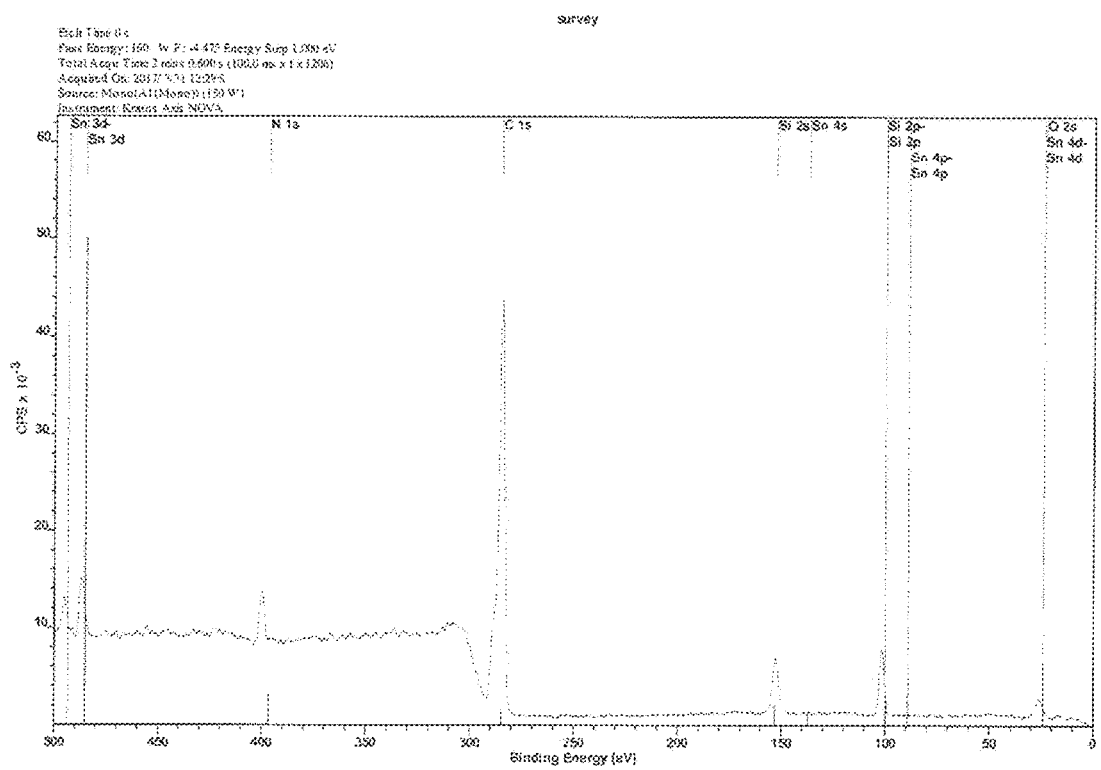
FIG. 16 shows XPS spectrum measured for a sample having 2.5 wt % PDMS.

The XPS spectrum (see FIG. 16) was measured on a Kratos Nova AXIS spectrometer equipped with an Al X-ray source. The sample was mounted onto a coated aluminum platen using double-sided adhesive Cu tape and kept under high vacuum ($10^{-9}$ Torr) overnight inside the preparation chamber before it was transferred into the analysis chamber (ultrahigh vacuum, $10^{-10}$ Torr) of the spectrometer. The XPS data were collected using $AlK_\alpha$ radiation at 1486.69 eV (150 W, 15 kV), charge neutralizer and a delay-line detector (DLD) consisting of three multi-channel plates. Binding energies are referred to the C1s peak at 285 eV. Survey spectra were recorded from −5 to 1200 eV at a pass energy of 160 eV (number of sweeps: 1) using an energy step size of 1 eV and a dwell time of 100 ms. High resolution spectra for O1s, N1s, C1s and Si2p were recorded in the appropriate regions at a pass energy of 20 eV (number of sweeps: Si2p/C1s, 10; N1s, 40; O1s, 5) using a dwell time of 300 s and energy step sizes of 0.1 eV (O1s, C1s, Si2p) and 0.05 eV (N1s). The analyzed area on the specimens was about 300×700 □ $m^2$ (lens mode: FOV 1) at this position and the electron take-off angle used was 45°.

Example 5. Preparation of CEOS/PEMA-g-PDMS Coatings

Figure 20:
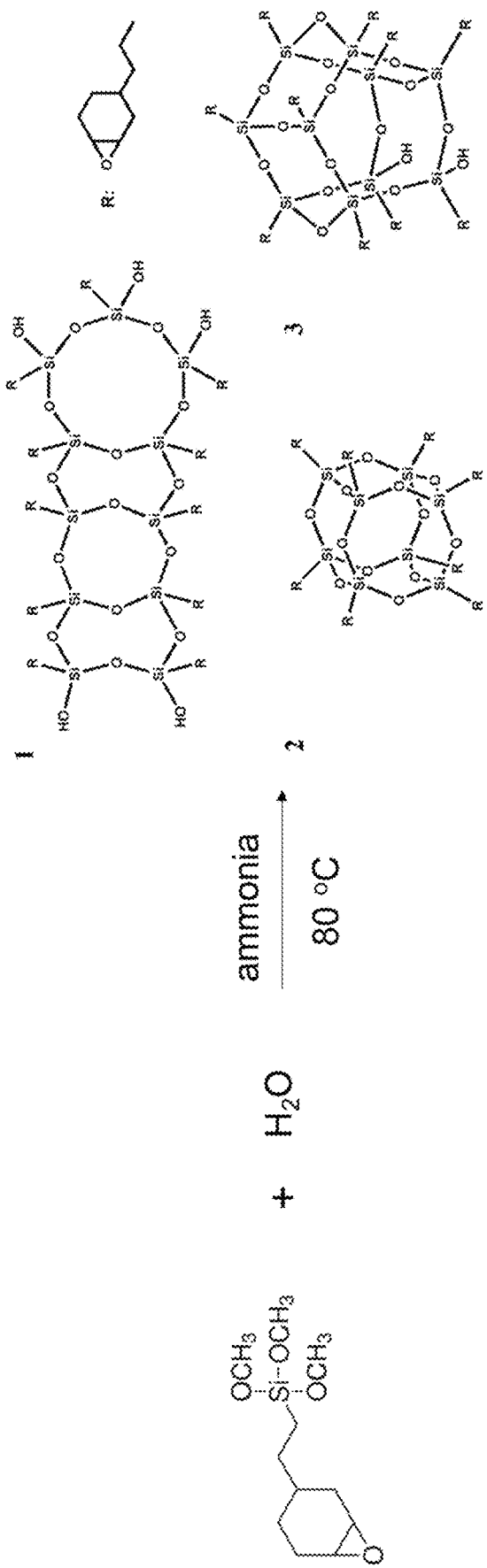
FIG. 20 shows Scheme 1, which depicts a synthetic pathway toward highly condensed cycloaliphatic epoxy-functionalized oligosiloxanes (CEOS).
Figure 21:
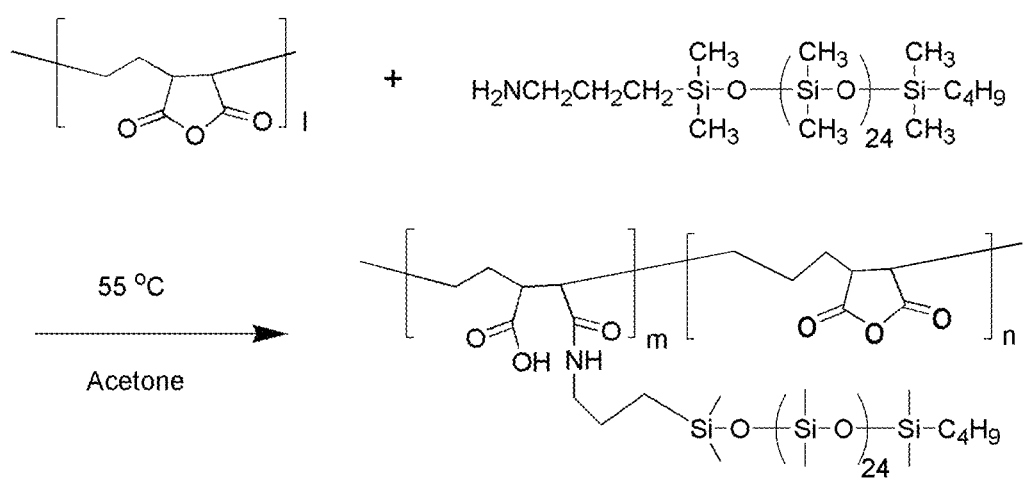
FIG. 21 shows Scheme 2, which depicts a synthetic pathway for PEMA-g-PDMS

CEOS/PEMA-g-PDMS coatings were prepared via copolymerization of highly condensed cycloaliphatic epoxy-functionalized oligosiloxanes (CEOS) and a graft copolymer poly(ethylene-co-maleic anhydride)-graft-poly(dimethyl siloxane) (PEMA-g-PDMS). CEOS was prepared via reactions depicted in Scheme 1 (see FIG. 20). The representative molecular structure of the CEOS (1. ladder-like, 2. cage, 3. partial cage) was confirmed by literature (Choi, G. M.; et al., *Advanced materials* (2017) 29: 19). Scheme 2 (see FIG. 21) provides a synthetic pathway to PEMA-g-PDMS.

Example 5A. Preparation of the Cycloaliphatic Epoxy-Functionalized Oligosiloxanes (CEOS)

CEOS was synthesized by sol-gel reaction of ECTMS, which was conducted following a modified literature procedure (Choi, G. M.; et al., *Advanced materials* (2017) 29: 19). As shown in Scheme 1, ECTMS (2.0 g, 8.1 mmol) and 2.0 M of $NH_3 \cdot H_2O$ aqueous solution (0.11 mL) were stirred under vigorous stirring at 80° C. for 18 hours. After the reaction, the CEOS was obtained as a clear and highly viscous liquid.

Example 5B. Preparation of PEMA-g-PDMS

Poly(ethylene-co-maleic anhydride) (1.8 g, 14 mmol anhydride) was dried under vacuum for 4 h before it was dissolved in 18 mL of acetone at 40° C. $PDMS-NH_2$ (0.20 g, 0.10 mmol) was dissolved in 2.0 mL acetone and the resultant solution was then added to the PEMA solution dropwise at 25° C. The mixture was heated to 55° C. overnight. The synthesis pathway of PEMA-g-PDMS is shown in Scheme 2 (see FIG. 21). After solvent evaporation, graft copolymer of PEMA-g-PDMS was obtained as a yellowish pellucid powder.

Example 5C. Preparation of Flexible Hard NP-GLIDE Coatings

A flexible hard NP-GLIDE coating was fabricated by chemically bonding PEMA-g-PDMS to CEOS resin via a ring-opening reaction of cycloaliphatic epoxy with carboxylic anhydride groups of PEMA during the thermal curing stage. In an example preparation, PEMA-g-PDMS (52 mg, containing 5.2 mg PDMS) was dissolved in 1.5 mL of acetone, then it was mixed with CEOS resin (100 mg, 0.37 mmol) in 1.5 mL of N-methyl-2-pyrrolidone (NMP), and stirred for 10 min. The mixture was subsequently drop casted onto glass slides and the slides were placed in a drying oven at 60° C. for 16 hours for the solvent evaporation. This was followed by heating at 120° C. for 24 hours to fully crosslink the coating.

The coatings with pencil hardness of 9H (the highest pencil hardness rating), were transparent, and could shrink marker easily. Prepared on a commercial 100 µm thick polyethylene terephthalate (PET) film, the coating was flexible.

The inventors suggest that this coating formulation could be further photocrosslinked. Possible photo-initiators include triarylsulfonium hexafluoroantimonate salts.

Figure 22:
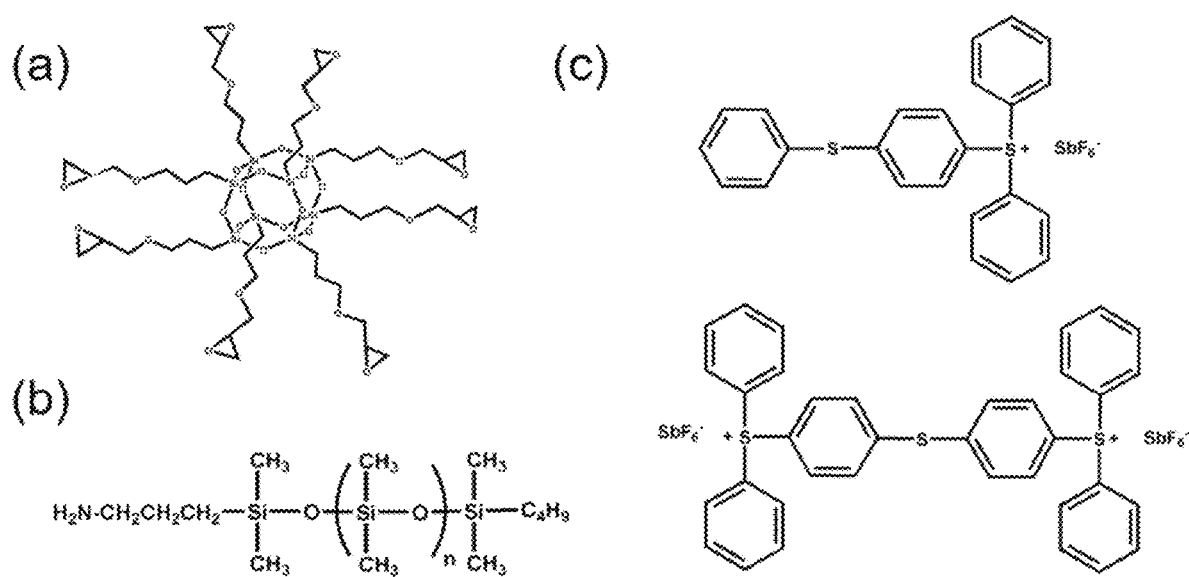
FIGS. 22A-C shows Scheme 3, which depicts chemical structures of (A) glycidyl POSS cage mixture, (B) mono-aminopropyl terminated polydimethylsiloxane, asymmetric, (C) triarylsulfonium hexafluoroantimonate salts, mixed (photoinitiator).

Example 6. UV-Curable Hard Anti-Smudge Epoxy Coatings that Include GPOSS-g-PDMS Preparation of GPOSS-g-PDMS coatings included reaction of PDMS-NH$_2$ (b) with an excess of a glycidyl polyhedral oligomeric silsesquioxane cage mixture (a, GPOSS, IT is a mixture because the silica cage core of POSS molecules is not pure. The chemical structures of some key reagents used in this example are given in Scheme 3. The core does not always consist of 8 Si atoms and can consist of 10 or 12 Si atoms) first to yield GPOSS-g-PDMS and GPOSS. To the resultant mixture was then added the triarylsulfonium hexafluoroantimonate salts (c). After solvent evaporation, the GPOSS and GPOSS-g-PDMS mixture was cured photochemically. See FIG. 22 for Scheme 3, which shows chemical structures of glycidyl POSS cage mixture, monoaminopropyl terminated polydimethylsiloxane, asymmetric, and triarylsulfonium hexafluoroantimonate salts, mixed (photoinitiator).

Example 6A. Synthesis of GPOSS-g-PDMS

GPOSS (1.00 g, epoxide 6.0 mmol) and PDMS-NH$_2$ (60 mg, 60 µmol) were dissolved in 1.5 mL of butyl acetate. The reaction mixture was refluxed at 120° C. for 1 hour subsequently. The resultant GPOSS-g-PDMS and butyl acetate mixture was used as coating ingredients directly without further purification.

Example 6B. Preparation of Hard Anti-Smudge Epoxy Coatings 0.67 mL of the GPOSS-g-PDMS solution (containing 300 mg of GPOSS-g-PDMS), triarylsulfonium hexafluoroantimonate salts (TSHFA) (15.0 mg, 10.6 NL) were dispersed in butyl acetate (1.73 mL) and propylene carbonate (0.60 mL) mixture to obtain a homogeneous solution. The above coating mixtures were drop cast onto 2.54 cm×2.54 cm glass slides. After casting samples, most solvent was evaporated overnight at 75° C. with gentle nitrogen flow. Furthermore, the coating samples was UV cured (500 W mercury lamp and had passed through a 274-nm cut-off filter) for at least 30 min to be fully crosslinked.

The coatings have outstanding wear resistance (#0000 steel-wool resistance), 9H pencil hardness, were transparent, and could shrink marker easily.

Example 7. Prophetic Examples

Figure 23:
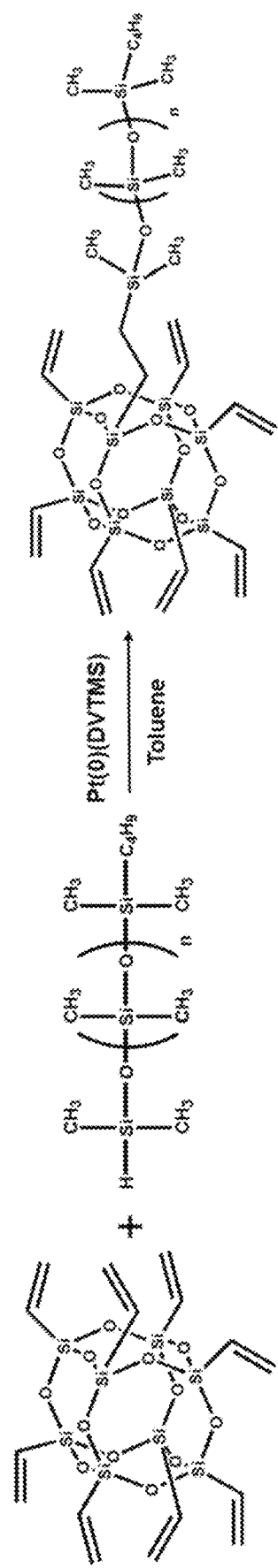
FIG. 23 shows Scheme 4, which depicts a synthetic pathway for VPOSS-g-PDMS

Without wishing to be bound by theory, the inventors suggest that UV curable anti-smudge hard coatings could also be obtained by free radical photo-polymerization that include vinyl POSS or VPOSS. An anti-smudge agent can be synthesized by covalently grafting PDMS to VPOSS. One way to achieve this coating is to first synthesize VPOSS-g-PDMS via hydrosilylation of a large excess of VPOSS with monohydride terminated polydimethylsiloxane (PDMS-SiH) using Pt-(0) (DVTMS) (Platinum divinyltetramethyldisiloxane complex) as the catalyst (see Scheme 4 in FIG. 23) Because VPOSS is used in a large excess, only one vinyl group per VPOSS is consumed in the grafting reaction. The resultant VPOSS and VPOSS-g-PDMS mixture is curable with an added photo-initiator under photolysis. The compatibility of VPOSS-g-PDMS and VPOSS might be better than that between GPOSS-g-PDMS and GPOSS due to the low polarity difference arise from the non-polar vinyl groups surrounding the POSS and non-polar PDMS.

Figure 24:
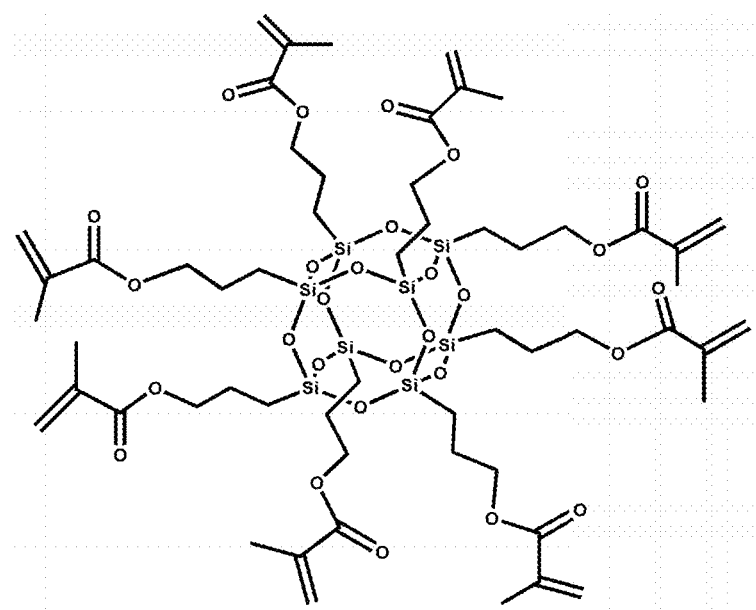
FIG. 24 shows Scheme 5, which depicts a chemical structure of methacryl POSS cage mixture.

It is further proposed that PDMS-MA, which is a PDMS chain bearing a methacrylate terminal group, can be directly mixed with a methacryl POSS cage mixture (MAPOSS, Scheme 5 in FIG. 24) and a photoinitiator. The mixture will then be cast and photolyzed to yield an anti-smudge coating. The compatibility between PDMS-MA and MAPOSS may not be good enough to yield a transparent coating. It is proposed that the compatibility may be improved by pre-polmerizing PDMS-MA and MAPOSS somewhat in a solvent before the mixture is cast. After solvent evaporation, the final film is further photocrosslinked.

Example 7C. Preparation of UV Curable Hard Epoxy Coatings (GPOSS Coatings, No Anti-Smudge Property)

Glycidyl POSS Cage Mixture (100 mg, containing 0.60 mmol of epoxy groups), and triarylsulfonium hexafluoroantimonate salts (TSHFA) (5.0 mg, 3.6 NL) were dissolved in butanone (2.0 mL) to obtain a homogeneous solution. The above coating mixtures were drop cast on a 2.54 cm×2.54 cm glass slide with certain solid weight. After casting samples, most solvent was evaporated overnight at 60° C. with gentle nitrogen flow. Furthermore, the coating samples was UV cured (500 W mercury lamp and had passed through a 274-nm cut-off filter) for at least 10 min to fully cure the sample. The coatings have outstanding wear resistance (i.e., 0000 superfine steel-wool resistance), 9H pencil hardness, and were transparent. However, the coating without incorporated PDMS had no anti-smudge properties.

It will be understood by those skilled in the art that this description is made with reference to certain preferred embodiments and that it is possible to make other embodiments employing the principles of the invention which fall within its spirit and scope as defined by the claims.

TABLE 1

| | | | | | |
|---|---|---|---|---|---|
| Comparison of the water and hexadecane SAs and CAs on different coatings. | | | | | |
| | 7% at | Hexadecane | | Water | |
| Sample | 500 nm | CA (°) | SA (°) | CA (°) | SA (°) |
| F0 | 99 ± 1 | Spreads | Spreads | 73 ± 1 | >85 |
| F2 | 98 ± 1 | 28 ± 1 | 2.4 ± 1 | 101 ± 1 | 66 ± 3 |
| F3 | 98 ± 1 | 28 ± 1 | 2.8 ± 1 | 102 ± 1 | 66 ± 4 |

We claim:
1. A composition for forming a transparent, antismudge coating, comprising:
   (i) a photoinitiator;
   (ii) a di-, tri-, or multi-functional monomer; and
   (iii) a graft copolymer bearing pendant double bonds and bearing polysiloxane, polyisobutyl or perfluorinated polyether side chains,
wherein the composition is adapted to be applied to a substrate and cured by exposure to light to form a transparent, antismudge coating on the substrate, and
   wherein the di-, tri-, or multi-functional monomer comprises TM, cycloaliphatic epoxy-functionalized oligosiloxanes (CEOS), methacryl polyhedral oligomeric silsesquioxane cage mixture (MAPOSS), glycidyl polyhedral oligomeric silsesquioxane cage mixture (GPOSS), vinyl polyhedral oligomeric silsesquioxane cage mixture (VPOSS), or a combination thereof

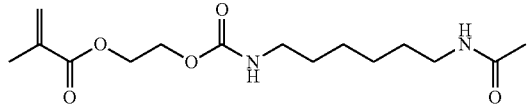

TM

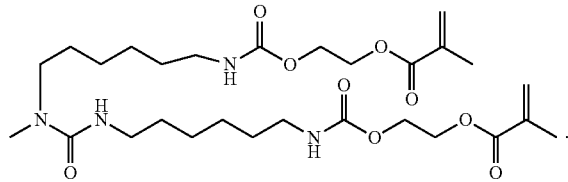

2. The composition of claim 1, wherein the graft copolymer comprises poly(dimethyl) siloxane (PDMS).

3. A composition for forming a transparent, antismudge coating, comprising:
   (i) a photoinitiator;
   (ii) a di-, tri-, or multi-functional monomer; and
   (iii) a graft copolymer bearing pendant double bonds and bearing polysiloxane, polyisobutyl or perfluorinated polyether side chains, wherein the composition is adapted to be applied to a substrate and cured by exposure to light to form a transparent, antismudge coating on the substrate, wherein the graft copolymer is POII-g-PDMS, GPOSS-g-PDMS, VPOSS-g-PDMS, or MAPOSS-g-PDMS

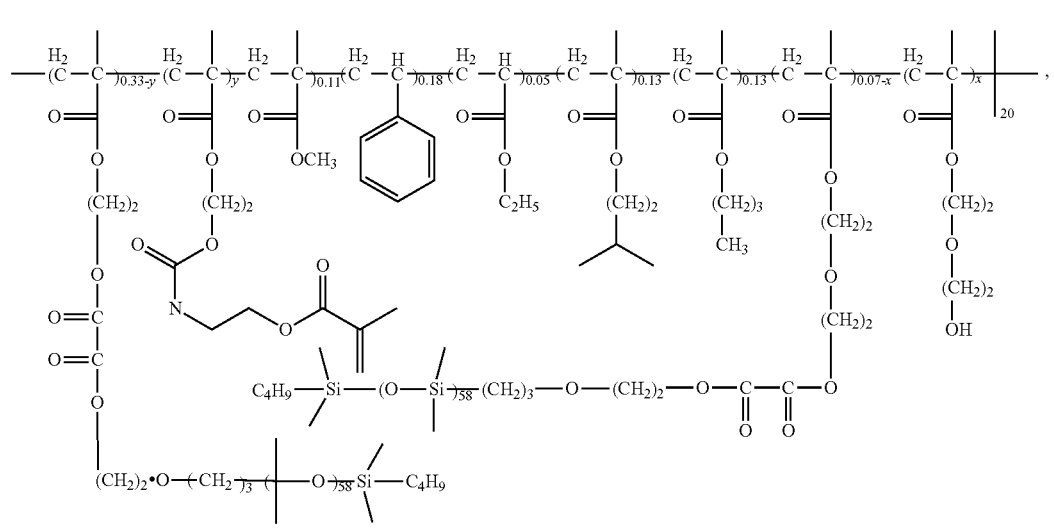

POII-g-PDMS

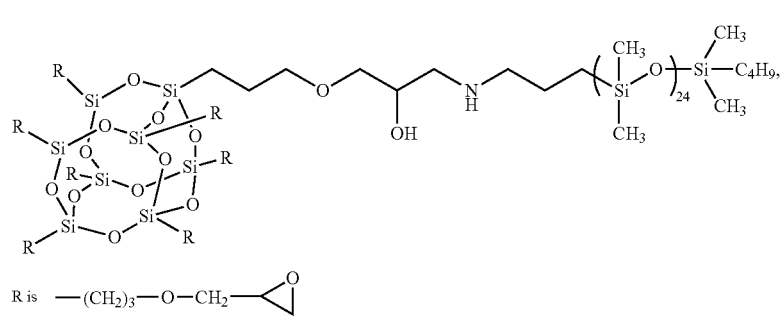

GPOSS-g-PDMS

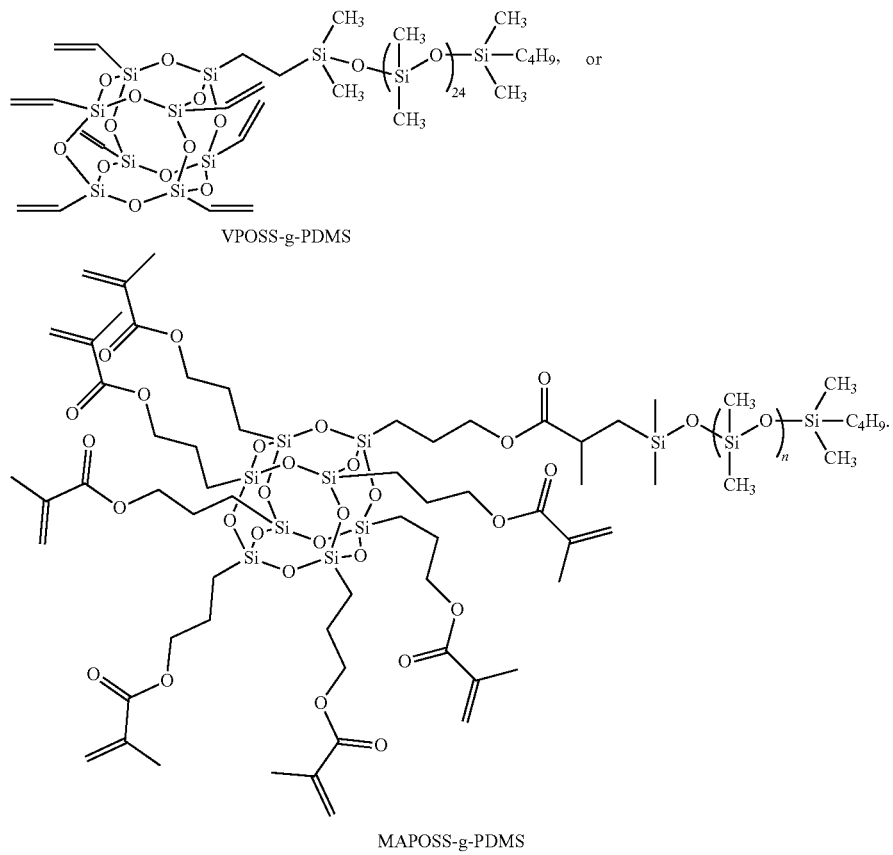

4. The composition of claim 1, wherein the di-, tri-, or multi-functional monomer comprises double bonds, epoxide groups, or a combination of double bonds and epoxide groups.

5. The composition of claim 1, wherein TM is prepared by reacting 2-hydroxy-ethyl methacrylate (HEMA) and hexamethylene diisocyanate trimer (HDIT) in a molar ratio of 3:1.

6. The composition of claim 1, wherein the photoinitiator is 2-hydroxy-2-methylpropiophenone, benzoin, benzoin ethyl ether, benzoin methyl ether, 4,4'-dimethoxy benzoin, 4,4'-dimethylbenzil, 4'-tert-butyl-2', 6'-dimethylacetophenone, 2,2,-diethoxyacetophenone, 2,2-dimethoxy-2-phenylacetophenone, 4'-phenoxyacetophenone, benzophenone, 4-benzoxyl biphenyl, triarylsulfonium hexafluoroantimonate salts, (7-ethoxy-4-methylcoumarin-3-yl)phenyliodonium hexafluoroantimonate, (7-ethoxy-4-methylcoumarin-6-yl)]phenyliodonium hexafluoroantimonate, (7-ethoxy-4-methylcoumarin-3-yl)phenyliodonium hexafluorophosphate, (7-ethoxy-4-methylcoumarin-6-yl)]phenyliodonium hexafluorophosphate, [4-(2-hydroxytetradecyloxy)phenyl] phenyliodonium hexafluoroantimonate or a combination thereof.

7. The composition of claim 1, wherein the graft copolymer comprises 30-40 wt % of PDMS.

8. The composition of claim 1, further comprising biocide, silica, titanium dioxide, diatomaceous earth, alumina, TiO$_2$, antioxidant, stabilizer, pigment, or a combination thereof.

* * * * *